United States Patent [19]
Morikawa

[11] Patent Number: 5,960,247
[45] Date of Patent: Sep. 28, 1999

[54] IMAGE FORMING APPARATUS CAPABLE OF READILY MANAGING SHEETS AFTER COMPLETION OF JOBS

[75] Inventor: Takeshi Morikawa, Toyokawa, Japan

[73] Assignee: Minolta Co., Ltd., Osaka, Japan

[21] Appl. No.: 08/967,037

[22] Filed: Nov. 10, 1997

[30] Foreign Application Priority Data

Nov. 12, 1996 [JP] Japan .................................. 8-300286
Nov. 12, 1996 [JP] Japan .................................. 8-300287

[51] Int. Cl.$^6$ .................................................. G03G 15/00
[52] U.S. Cl. .............................. 399/382; 399/43; 399/84; 399/388
[58] Field of Search .................................... 399/382, 404, 399/43, 76, 77, 82, 83, 381, 84, 388; 358/296, 470; 395/114, 115, 116

[56] References Cited

U.S. PATENT DOCUMENTS

| 4,716,438 | 12/1987 | Farrell ........................................ 399/84 |
| 4,811,111 | 3/1989 | Kurokawa .............................. 358/470 X |
| 5,124,748 | 6/1992 | Tanabe et al. ...................... 399/382 X |
| 5,128,762 | 7/1992 | Muramatsu et al. .................... 358/296 |
| 5,243,381 | 9/1993 | Hube ........................................ 399/84 |
| 5,316,279 | 5/1994 | Corona et al. ...................... 399/381 X |
| 5,669,040 | 9/1997 | Hisatake .................................. 399/83 |

FOREIGN PATENT DOCUMENTS 5-75772   3/1993   Japan .

*Primary Examiner*—Arthur T. Grimley
*Assistant Examiner*—Sophia S. Chen
*Attorney, Agent, or Firm*—Burns, Doane, Swecker & Mathis, LLP

[57] ABSTRACT

A copying machine includes a memory unit capable of storing a plurality of jobs, a printing processing unit for executing one of the job stored in the memory unit to form an image, and a control unit for controlling the printing processing unit to provide a wait operation for starting executing a job stored in the memory unit when a predetermined time period elapses after the completion of the execution of another job by the printing processing unit is detected. This allows a user-friendly copying machine which manages a plurality of jobs, wherein a set of output sheets for an output job can readily be removed from the sheet discharging tray.

4 Claims, 28 Drawing Sheets

MEMORY MODE READ OPERATION

FIG. 15A

| REGION | PAGE NO. PN | FW LINKAGE | BW LINKAGE | ADDITIONAL INFORMATION |
|---|---|---|---|---|
| 01 | 1 | 00 | 02 | |
| 02 | 1 | 01 | FF | |
| 03 | 2 | 00 | 04 | |
| 04 | 2 | 03 | FF | |
| ⋮ | | | | |

| | |
|---|---|
| 0 | |
| 32K | COMPRESSED DATA 1 OF PAGE 1 |
| 64K | COMPRESSED DATA 2 OF PAGE 1 |
| 96K | COMPRESSED DATA 1 OF PAGE 2 |
| 128K | COMPRESSED DATA 2 OF PAGE 2 |
| ⋮ | |

} 404

IMAGE FORMING APPARATUS CAPABLE OF READILY MANAGING SHEETS AFTER COMPLETION OF JOBS

BACKGROUND OF THE INVENTION

1. Field of the Invention

The present invention relates to an image forming apparatus, and in particular to an image forming apparatus with a multi-job function which allows management of multiple jobs.

2. Description of the Related Art

Image forming apparatuses with multi-job function include, for example, that which has a memory for storing image information and can read an original as a job while another job is being printed out.

Conventional image forming apparatuses with multi-job function first completes a job being printed and then starts printing out the next job, as disclosed in Japanese Patent Laid-Open No. 5-75772.

Thus, discharged printed sheets of a job overlap a set of discharged sheets of the preceding printed job and this makes it difficult to remove only the set of the discharged sheets of the preceding job. Furthermore, when the sheet size for a job is the same as that for the next job, the jobs must be identified according to the images printed and this makes the apparatus less user-friendly.

To reduce the overall output time for a plurality of jobs, however, outputting a job need be started as soon as possible after the output of the preceding job is completed.

SUMMARY OF THE INVENTION

One object of the present invention is to provide a user-friendly image forming apparatus.

Another object of the present invention is to provide an image forming apparatus capable of readily removing printed sheets from the apparatus for each job.

Still another object of the present invention is to provide an image forming apparatus capable of setting a print end time for a job.

In one aspect of the present invention, an image forming apparatus includes an image forming unit for providing image formation corresponding to a print job on a sheet according to image data, an accommodation unit for accommodating a sheet having an image formed thereon, and a discharger for discharging a sheet having information for identifying the print job printed thereon onto the sheet provided with the image formation corresponding to the print job and accommodated in the accommodation unit.

Since a sheet having information for identifying an executed print job printed thereon is discharged onto a sheet on which the job is executed, a user can readily identify his or her job. This allows a user-friendly image forming apparatus.

In another aspect of the present invention, an image forming method includes the steps of: providing image formation corresponding to a print job on a sheet according to image data; accommodating the sheet having the image formed thereon into a tray; and discharging a sheet having information for identifying the print job printed thereon onto the sheet provided with the image formation corresponding to the print job and accommodated in the tray.

In still another aspect of the present invention, an image forming apparatus includes an image forming unit for providing image formation on a sheet according to image data, a first execution unit for executing image formation corresponding to a first print job by the image forming unit, a register for registering a second print job while the first print job is executed, and a second execution unit for providing image formation corresponding to the second print job registered by the register when a predetermined period of time elapses after the image formation corresponding to the first print job is completed.

Execution of a first job is first completed, and a predetermined period of time then elapses before a second job is executed. Accordingly, the image forming apparatus is stopped for the predetermined period of time in switching the print operation for a job and the set of discharged sheets of the first job can thus be readily removed from the sheet discharging tray.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 15A and 15B illustrate a management table representing a relation between a job and the code memory according to the second embodiment.

DESCRIPTION OF THE PREFERRED EMBODIMENTS

Figure 1:
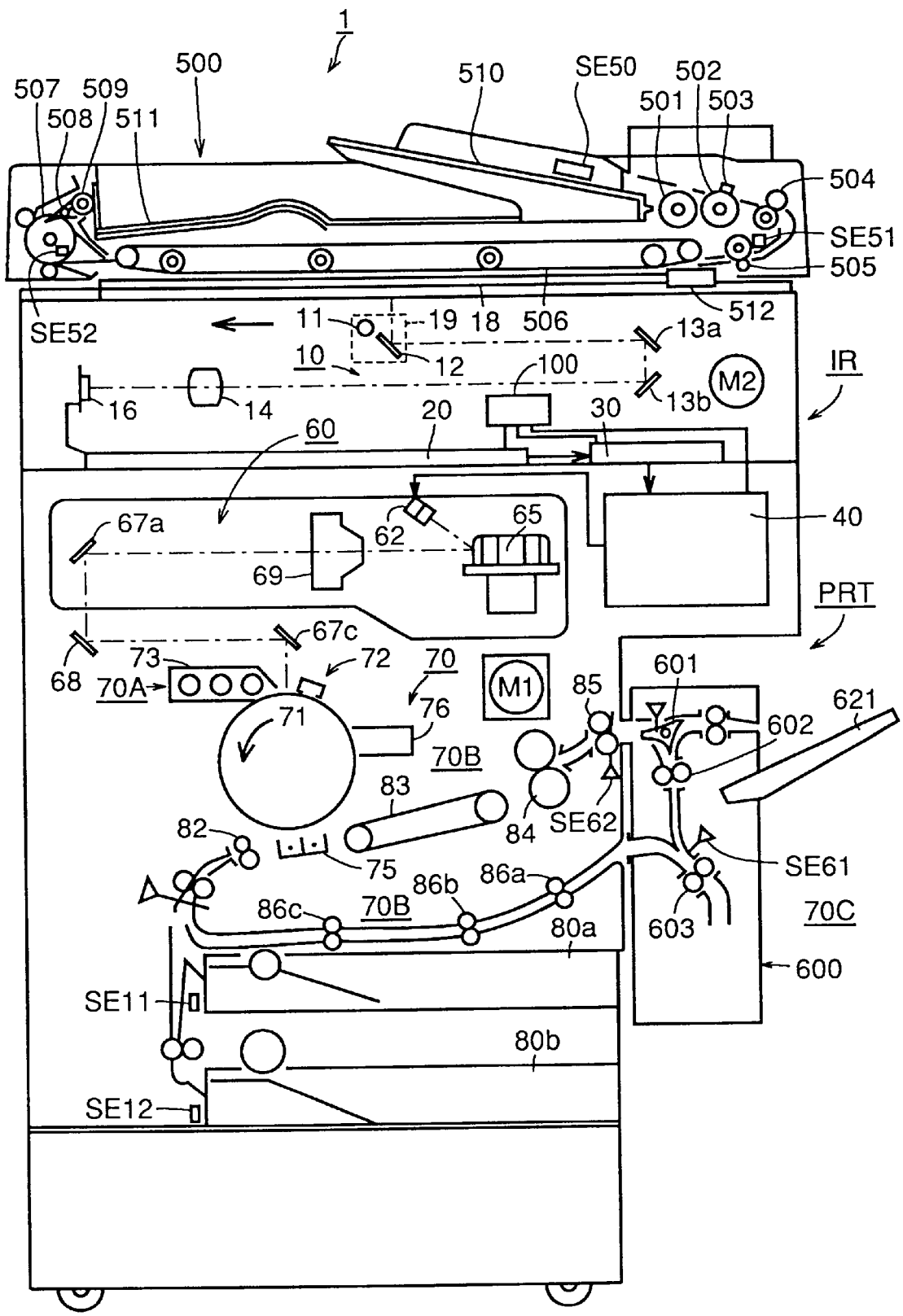
FIG. 1 is a front cross section of the entire configuration of a copying machine to which the first and second embodiments are employed.

Hereinafter, embodiments of the present invention will now be described with reference to the figures. First of all, the common configuration for the first and second embodiments is described. Referring to FIG. 1, a copying machine 1 includes an image reader IR and a page printer PRT.

Image reader IR includes: a scan system 10 for resolving an original placed on a platen glass 18 into pixels and reading the pixels; an image processing unit 20 for providing quantization of photoelectric conversion signals output from scan system 10 and signal processings according to various image forming modes; a memory unit 30 for storing image data corresponding to an original; and a control unit 100 for controlling the entirety of copying machine 1. An additional, automatic document feeder (referred to as an "ADFR" hereinafter) 500 also serving as an original cover is mounted onto image reader IR such that ADFR 500 pivots about the back end thereof.

Scan system 10 is a line scanning, image reading mechanism. Scan system 10 includes a scanner 19 including an original illuminating lamp 11 and a mirror 12, mirrors 13a and 13b, a condenser lens 14, an image sensor 16 formed of CCD (Charge Coupled Device) array, and a scan motor M2 for driving scanner 19. Image signal processing unit 20 and memory unit 30 will be described later.

ADFR 500 includes: a sheet feeding roller 501, a sorting roller 502, a sorting pad 503, an intermediate roller 504, a registering roller 505 and a transport belt 506 for transporting an original set on an original stacker 510 onto platen glass 18; a reversing roller 507 for reversing an original; a switching claw 508; a sheet discharging roller 509 for discharging a read original onto a discharging tray 511; an original scale 512; an original sensor SE 50 for detecting the presence/absence of an original; an original size sensor SE 51; and a discharge sensor SE 52.

Page printer PRT includes: a printing processing unit 40 for outputting an exposure control signal; a print head 60 with a semiconductor laser 62 as its light source; a developing and transfer system 70A formed of a photoreceptor drum 71, a corona charger 72 for charging photoreceptor drum 71, a developing device 73, and a transfer charger 75 for transferring the developed image onto a sheet; a fixation and discharge system 70B including a timing roller 82, a transport belt 83, a pair of fixation rollers 84, a discharging roller 85, and horizontal transport rollers 86a, 86b and 86c; a sheet transport system 70C including a sheet refeeder unit 600; two sheet cassettes 80a and 80b for housing approximately 100 sheets; and sheet size detection sensors SE 11 and SE 12.

Print head 60 includes a polygon mirror 65 for deflecting a laser beam, a main lens 69 for guiding the laser beam deflected by polygon mirror 65 to the photoreceptor drum, and various mirrors 67a, 68 and 67c.

Sheet refeeder unit 600 includes a switching claw 601, a transport roller 602, a reversible roller 603, a sheet sensor SE 61, and sheet discharging tray 621.

In copying a plurality of originals, an operator sets the originals by stacking them on original stacker 510 with their front sides facing upward. The originals on original stacker 510 are successively drawn one by one from the bottom original and precisely set at the reading position on platen glass 18 with the front sides facing downward. For the one-side original mode, when image reader has finished reading an original, the original is transported in the left direction in the figure and discharged onto discharging tray 511 with the front side facing upward. For the two-side original mode, an original transported in the left direction after image reader IR has finished reading the front side thereof is turned over by reversing roller 507 and returned to the reading position on platen glass 18. Then, the original has its back side read and is then again transported in the left direction and discharged onto discharging tray 511.

Page printer PRT forms an image by the electrophotography process described below, based on the image data read by image reader IR and transferred to printing processing unit 40.

A laser beam emanating from semiconductor laser 62, which is responsive to a signal output from printing processing unit 40 based on image data, is deflected by polygon mirror 65 in the main scanning direction and guided to an exposure position of photoreceptor drum 71 via main lens 69 and various mirrors 67a, 68 and 67c. The surface of photoreceptor drum 71 is uniformly charged by corona charger 72. Thus, a latent image formed through exposure forms a toner image via developing device 73. The toner image is transferred at the transfer position by transfer charger 75 onto a sheet fed from sheet cassette 80a, 80b. The sheet with the toner image transferred thereon is then separated from photoreceptor drum 71, transported by transport belt 83 to the pair of fixation rollers 84, and discharged faceup, i.e., with its front side facing upward, onto discharging tray 621.

Sheet refeeder unit 600 is an additional device for automating two-side copy and is mounted to a side of page printer PRT. Sheet refeeder unit 600 temporarily accommodates sheets discharged from the body of the page printer by discharging roller 85 and then sends the sheets back to the body of the page printer by switch-back transporting.

In the one-side copy mode, a sheet passes through sheet refeeder unit 600 and discharged onto discharging tray 621 with its image-formed side facing upward. In the two-side copy mode, a solenoid (not shown) causes the left end of switching claw 601 to move upward, and a sheet discharged by discharging roller 85 passes through transport roller 602 and reaches reversible roller 603. When the rear end of the sheet reaches sheet sensor SE 61, reversible roller 603 reverses. This allows the sheet to be returned to the body of the page printer. The returned sheet is transported via horizontal transport rollers 86a, 86b and 86c and waits at timing roller 82. If a plurality of sheets are successively fed, the sheets are successively transported with a predetermined sheet interval therebetween so that the sheets do not overlap each other, and are thus sent into sheet refeeder unit 600. Since the path for transporting sheets has a predetermined length, the number N of sheets for one cycle by sheet refeeder unit 600 and horizontal transport rollers 86a–86c, i.e., the maximum number N of sheets cycled, depends on the size of the sheets used.

Figure 2:
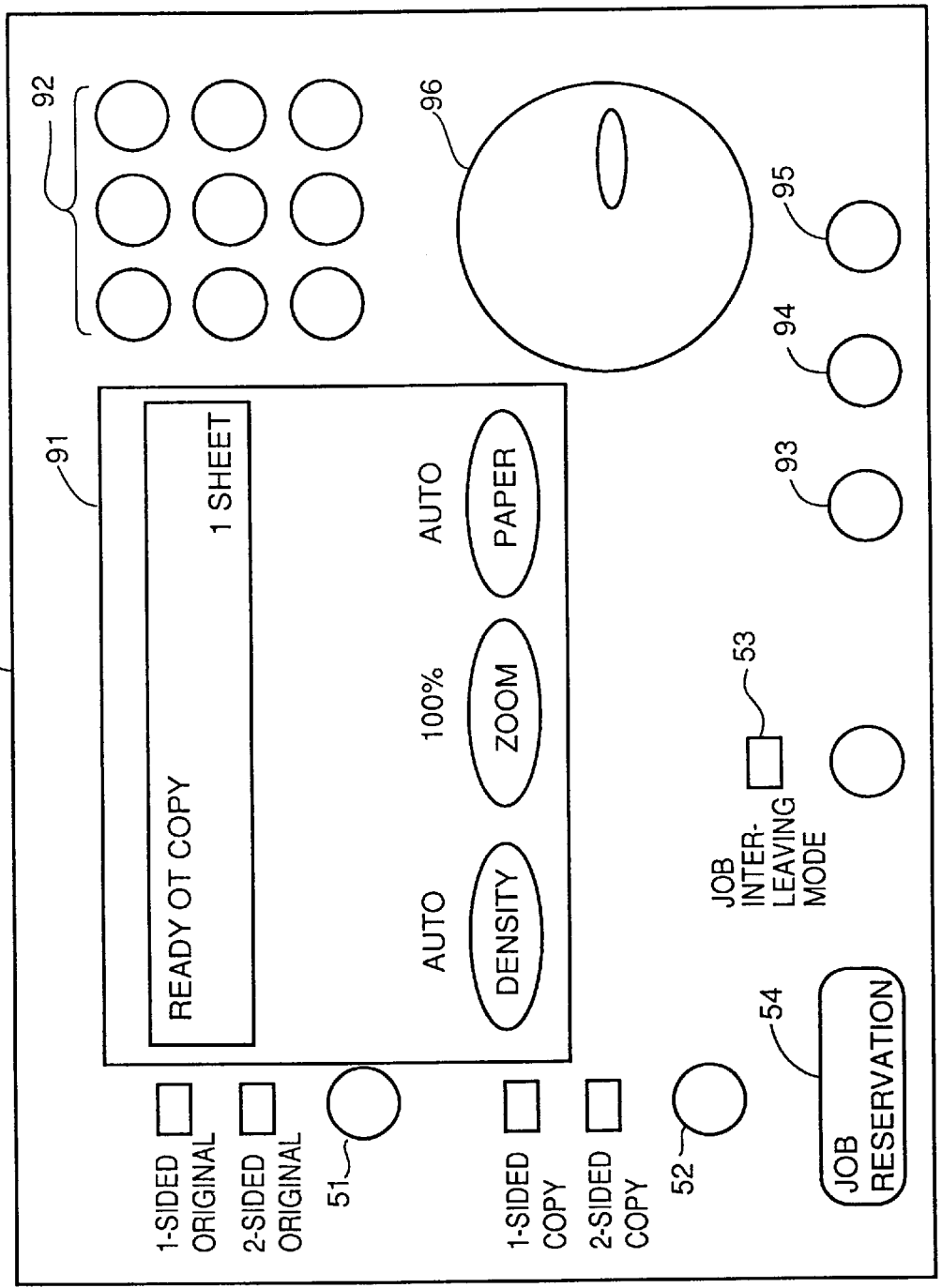
FIG. 2 is a plan view of the operation panel of the copying machine 1.

FIG. 2 is a plan view of an operation panel OP of the copying machine 1. Operation panel OP includes a touch panel 91 for displaying states and designating various modes, a ten-key 92 for inputting numerical conditions (e.g., the number of sheets to be copied, zoom ratio) for copying, a clear key 93 for resetting a numerical condition to the standard value, a panel reset key 94 for initializing copy modes, a stop key 95 for directing that copying is stopped, a start key 96 for directing that copying is started, an original designation key 51 for designation of one-side original or two-side original, a copy mode key 52 for switching between two-side copy and one-side copy, an interleaf setting key 53 for setting whether an interleaf is output, and a job reservation key 54 for reserving a job.

Figure 3:
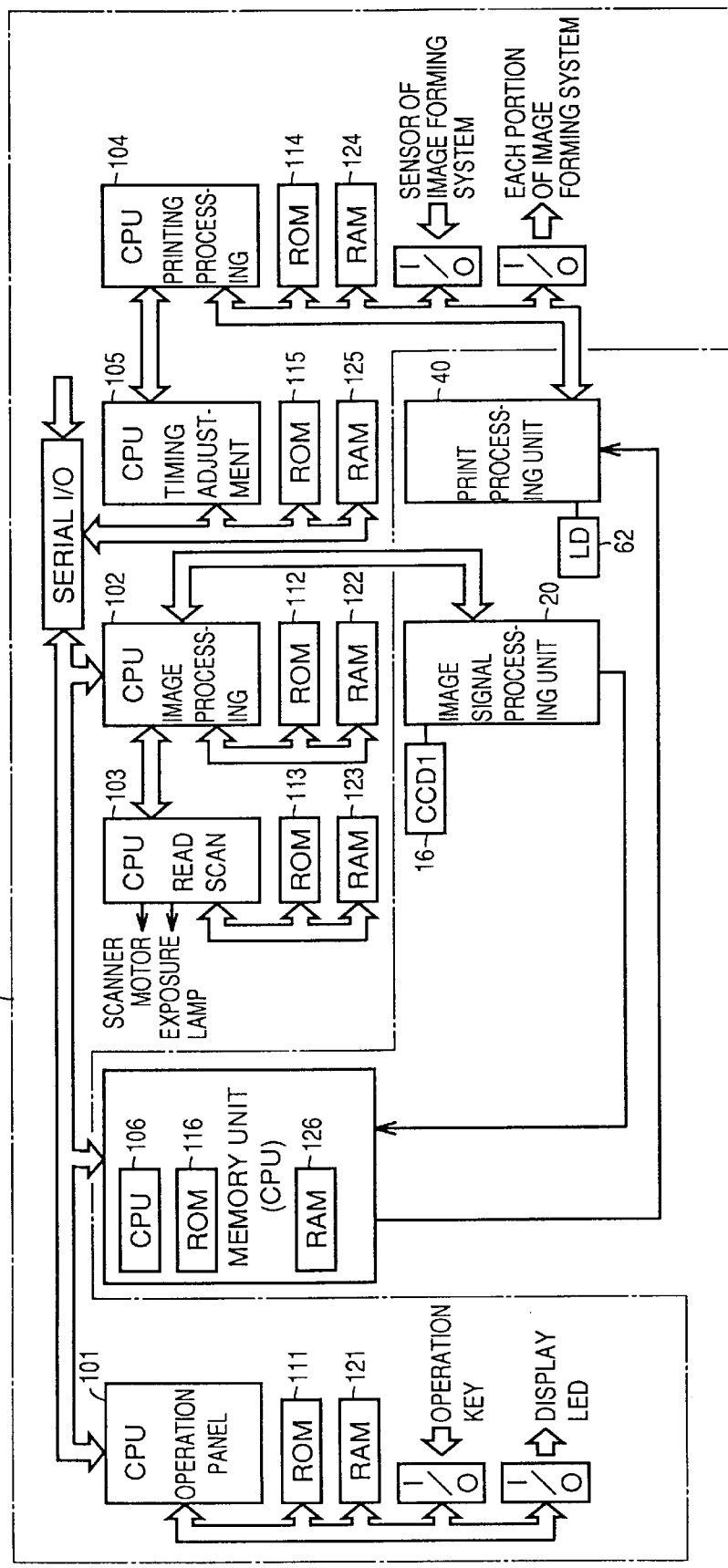
FIGS. 3 and 4 are block diagrams showing configurations of the control unit of the copying machine.
Figure 4:
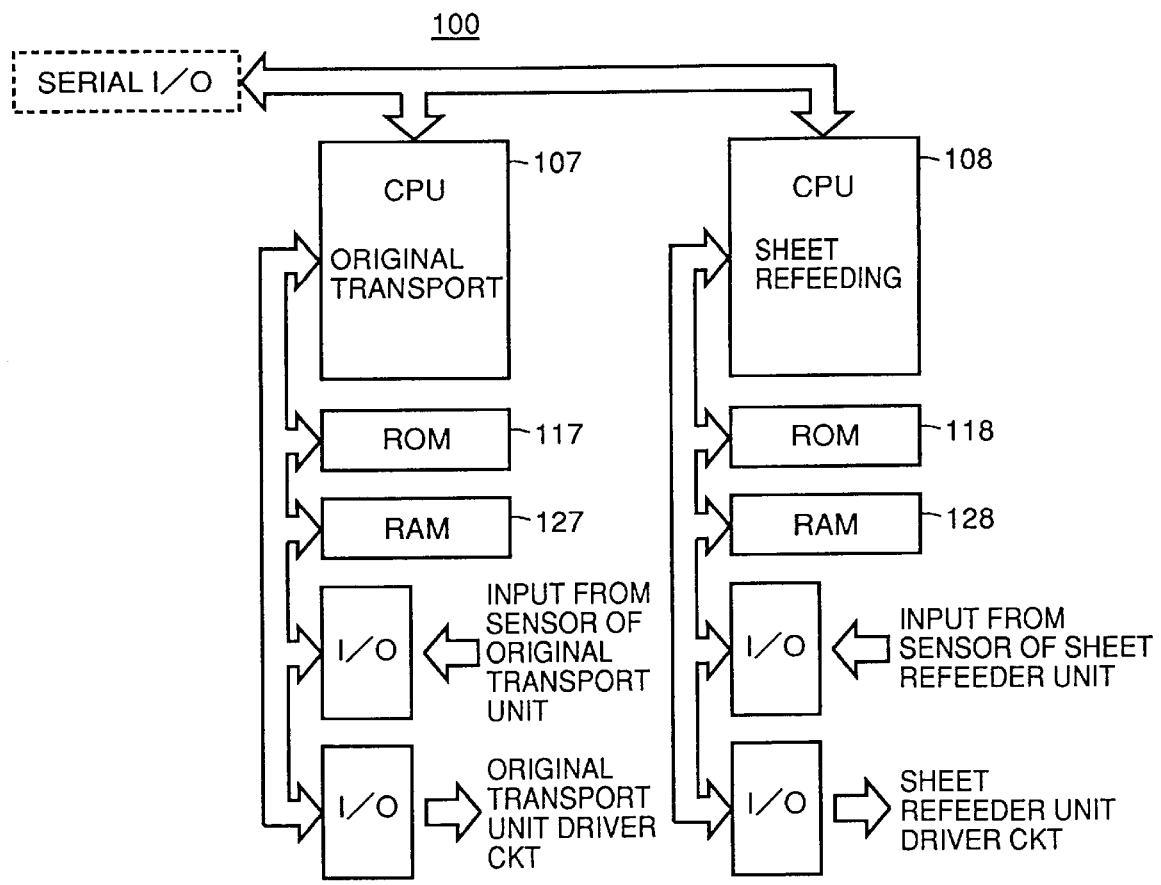

FIGS. 3 and 4 are block diagrams showing a configuration of the control unit of copying machine 1. The components identical to those described with reference to FIG. 1 are labeled by the identical reference characters and a detailed description thereof is thus not repeated. Control unit 100 includes seven CPUs (Central Processing Units) 101–105, CPU 107 and CPU 108. The CPUs includes ROMs (Read Only Memories) 111–115, ROM 117 and ROM 118 each storing a program, and RAMs (Random Access Memories) 121–125, RAM 127 and RAM 128, respectively. CPU 106, ROM 116 and RAM 126 are provided within memory unit 30.

CPU 101 controls signal inputs from various operation keys on operation panel OP as well as displaying on operation panel OP. CPU 102 controls various portions of image signal processing unit 20. CPU 103 controls the driving of scan system 10. CPU 104 controls page printer PRT, including printing processing unit 40. CPU 105 provides the general timing adjustment for control unit 100 and a processing for setting modes of operation. Thus, CPU 105 performs serial communication with the other CPUs to transmit and receive commands and reports required for control. CPU 106 controls the storing and reading of image information. CPU 107 controls the transporting of originals by ADFR 500. CPU 108 controls sheet refeeder unit 600. As mentioned above, the configuration of the copying machine 1 described above is common to the following first and second embodiments.

First Embodiment

Figure 5:
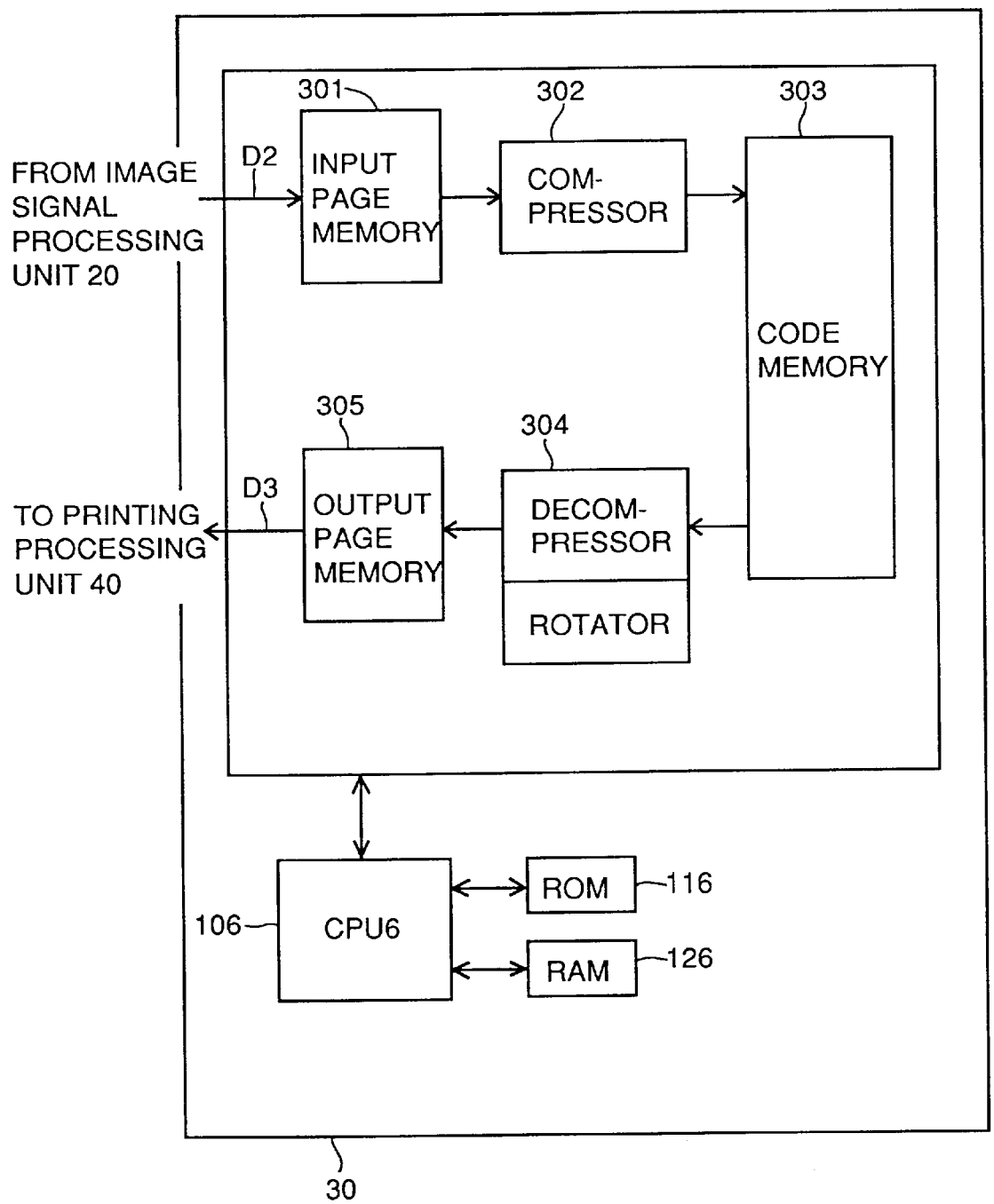
FIG. 5 is a block diagram showing a configuration of the memory unit according to the first embodiment.

FIG. 5 is a block diagram showing a configuration of memory unit 30 according to a first embodiment. Referring to FIG. 5, in memory unit 30 in reading, image data D2 read by image reader IR is transferred from image signal processing unit 20 to an input page memory 301. Then, the image transferred to input page memory 301 is compressed by compressor 302 for each page and is then transferred to a code memory 303. In printing, a compressed image in code memory 303 is decompressed by a decompressor 304. If image rotation is required, rotation processing by rotator provided at decompressor 304 is provided in the decompression for each page. That is, rotation processing and decompression processing are simultaneously provided. The decompressed image data is transferred to an output page memory 305. Then, the image data is transferred from output page memory 305 to printing processing unit 40. The data transfers in FIG. 4 are performed independent from each other and in parallel to improve copying rate. Each image data is DMA (Direct Memory Access)-transferred by a DMA controller (not shown).

Memory unit 30 is controlled by CPU 106 according to the program stored in ROM 116. A parameter and the like required for executing the program are stored in RAM 126.

Figure 6:
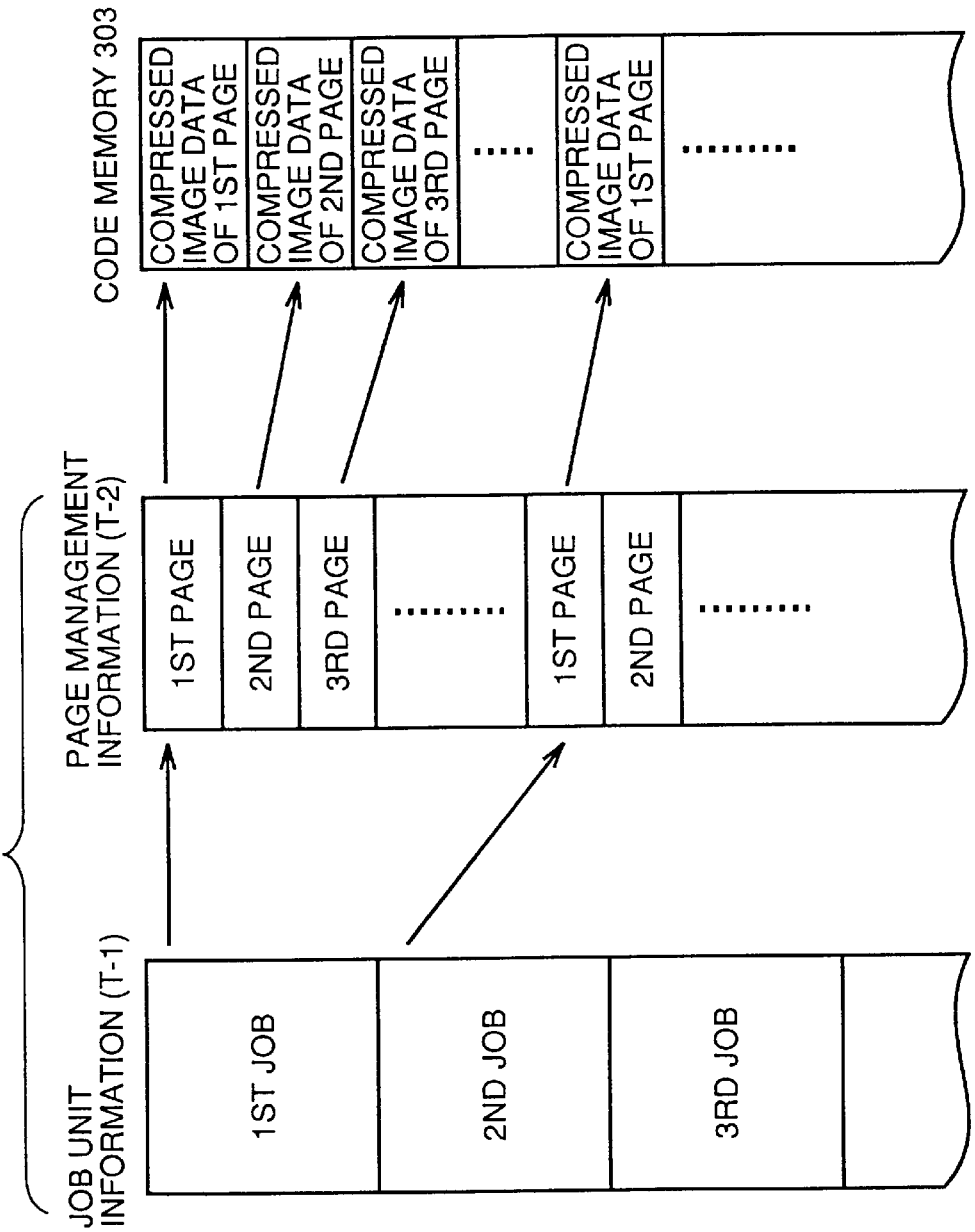
FIG. 6 schematically illustrates a management table illustrating a relation between jobs and the code memory according to the first embodiment.

FIG. 6 schematically illustrates a management table showing a relation between jobs and the code memory according to the first embodiment. In temporarily storing an image of an original, code memory 303 is managed by a management table provided within RAM 126. In reading an original for compression, image information needs be managed for each job. In each job, the image information is divided and stored for each page. Thus, the table has a page management information table (T-2) for storing the divided information for each page and a information-per-job table (T-1) for storing the information for each job.

Information-per-job table T-1 stores the information on a job ID, the registration state of the job, the storing location of page management information and the like, and the copy mode information on the number of sheets designated (the number of copies) and the like. Page management information table T-2 stores the storing locations of compressed image data.

In reading image data from input page memory 301 according to a direction from CPU 105 and compressing the read image data, CPU 106 forms information for the management table while controlling compressor 302 to store compressed image data into code memory 303. In outputting image data, CPU 106 provides the opposite operation to read compressed image data from code memory 303. The information in the management table is erased when the information of the page of interest is normally read and the number of sheets (copies) designated by the operator have been copied.

Figure 7:
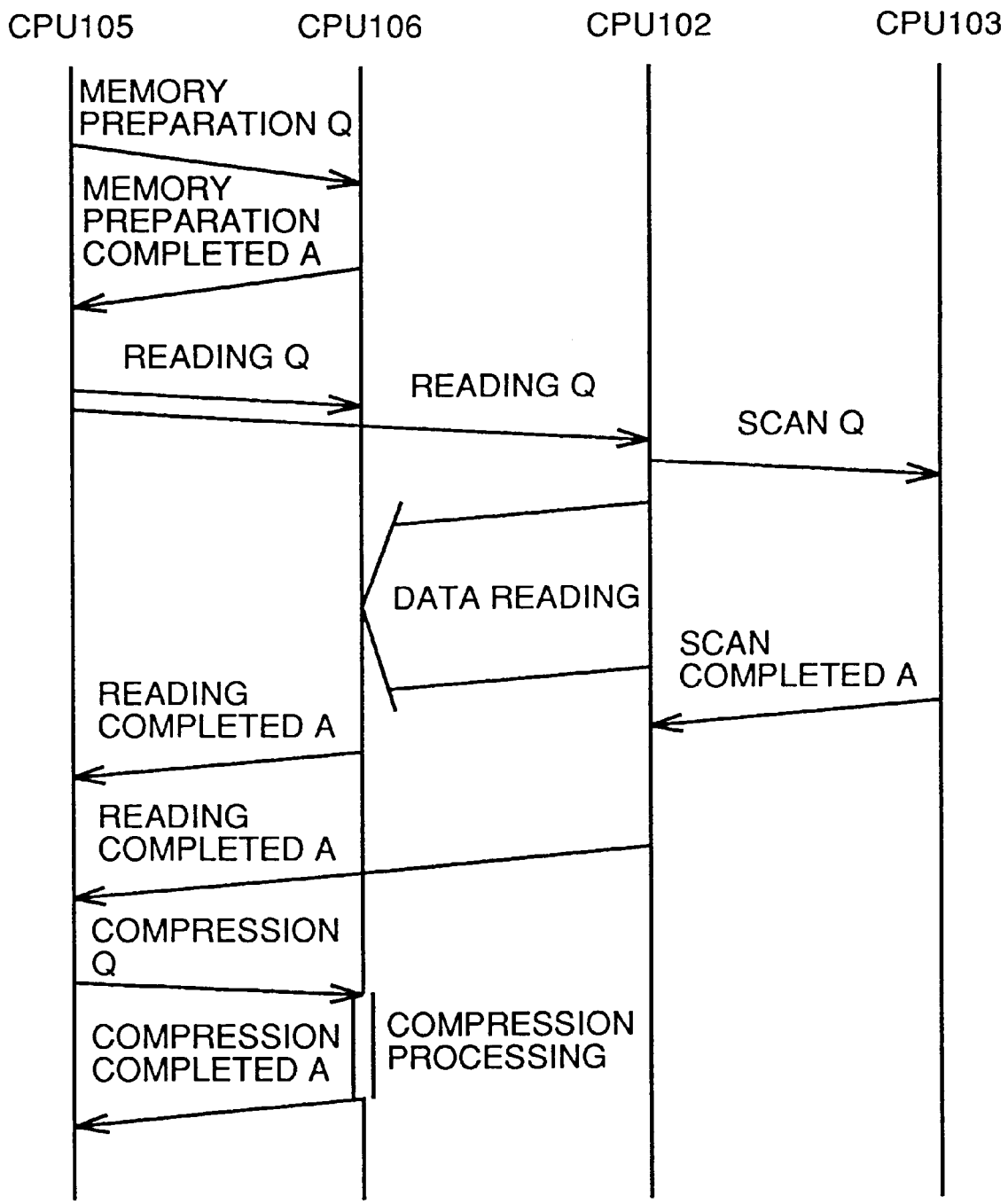
FIG. 7 illustrates a schematic sequence of an original read operation according to the first embodiment.

An operation sequence of copying machine 1 in original reading and printing will now be described mainly with respect to the request commands (Q), reports (A) and data stream among CPUs 101–106. FIG. 7 shows a schematic sequence of an original read operation according to the first embodiment. In the original read operation, image signal processing unit 20 transfers image data to memory unit 30.

First, CPU 105, which controls the general sequence, requests to CPU 106 for memory preparation. Responsively, CPU 106 sets for an internal hardware a bus connection state for transferring image data D2 from image signal processing unit 20 to memory unit 30.

When the setting is completed and the preparation is thus completed, CPU 106 signals to CPU 105 that a memory preparation is completed. When CPU 105 requests to CPUs 106 and 102 for reading, CPU 102 requests to CPU 103 for scanning.

CPU 103 starts scanning, and by way of scanner 19 image data is transferred by image sensor 16 to image processing unit 20. The read data (image data D2) is then transferred from image signal processing unit 20 to memory unit 30 according to an image processing mode set by CPU 102.

When the scanning is completed and CPUS 102 and 106 signal to CPU 105 that the reading is completed, CPU 105 requests to CPU 106 for data compression. CPU 106 responsively initiates various portions, as described above. This allows compression processing and compressed data is stored into code memory 303. When the compression processing is completed, CPU 106 signals to CPU 105 that a compression is completed.

Figure 8:
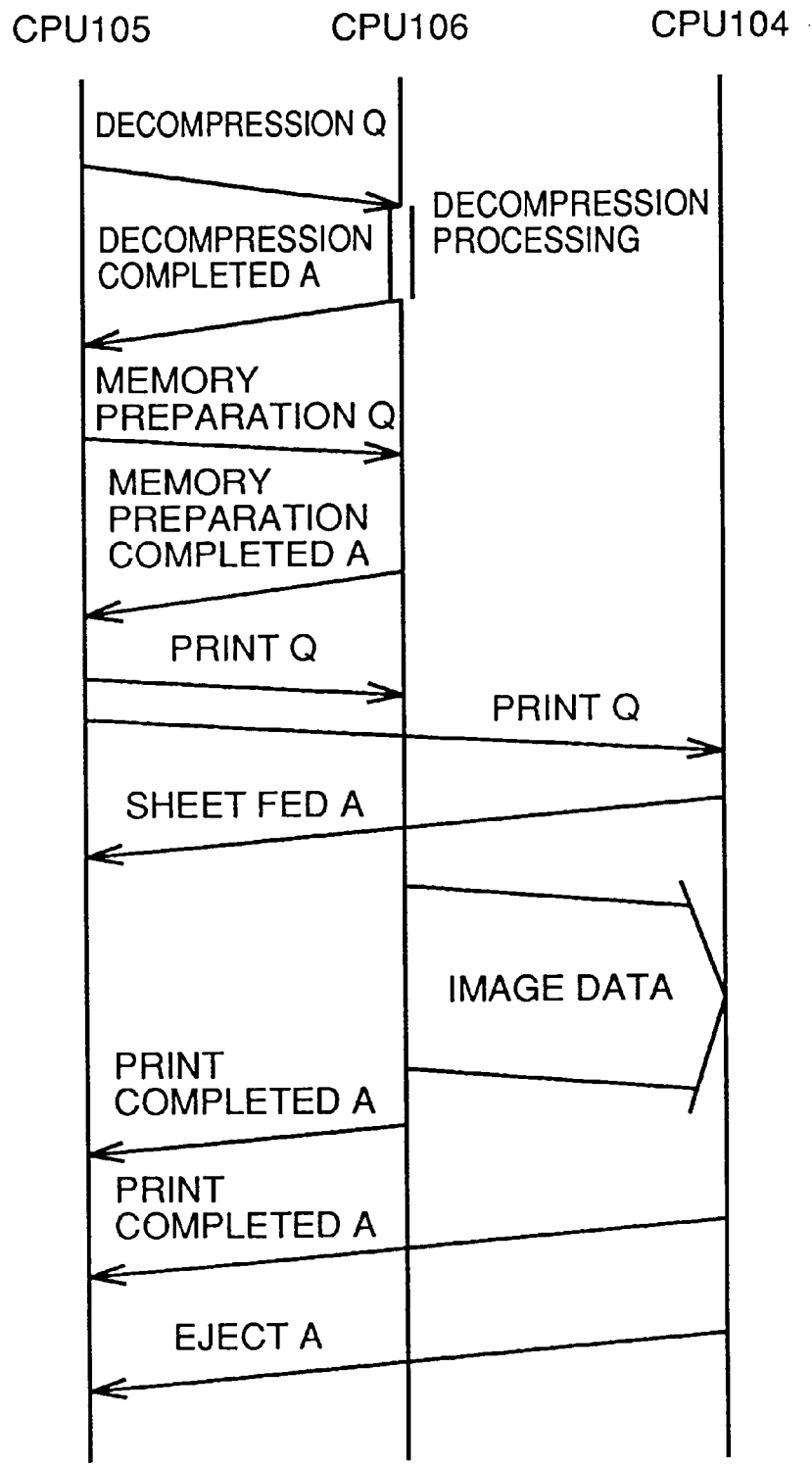
FIG. 8 illustrates a schematic sequence of a print operation according to the first embodiment.

FIG. 8 shows a schematic sequence of the print operation according to the first embodiment. In the print operation, image data is read from code memory 303 and a copied image is printed on a sheet according to the image data.

CPU 105 requests to CPU 106 for data decompression. CPU 106 initiates various portions, as described above. A decompression processing is thus performed and image data is written into output page memory 305. Then, CPU 106 sends to CPU 105 a report that the decompression is completed.

When the decompression processing is completed, CPU 105 requests to CPU 106 for memory preparation so as to read the image data from output page memory 305. Responsively CPU 106 sets for the internal hardware the bus connection state for transferring image data D3 from output page memory 305 to printing processing unit 40, the rotation processing and the like. Then, CPU 106 sends to CPU 105 a report that the memory preparation is completed.

When these processings and hence the preparation are completed and CPU 105 is signaled accordingly, CPU 105 requests to CPUs 106 and 104 for printing out. CPU 104 sends to CPU 105 a sheet-feeding report for informing CPU 105 of the transport state of a sheet. Then, image data D3 read from input page memory 305 is output to printing processing unit 40 and printing out is performed.

When the printing out is completed, CPUs 106 and 104 sends to CPU 105 a report that the printing is completed and a report that eject is completed. When CPU 105 receives these reports, CPU 105 provides a memory clear request to CPU 106, as required.

Figure 9:
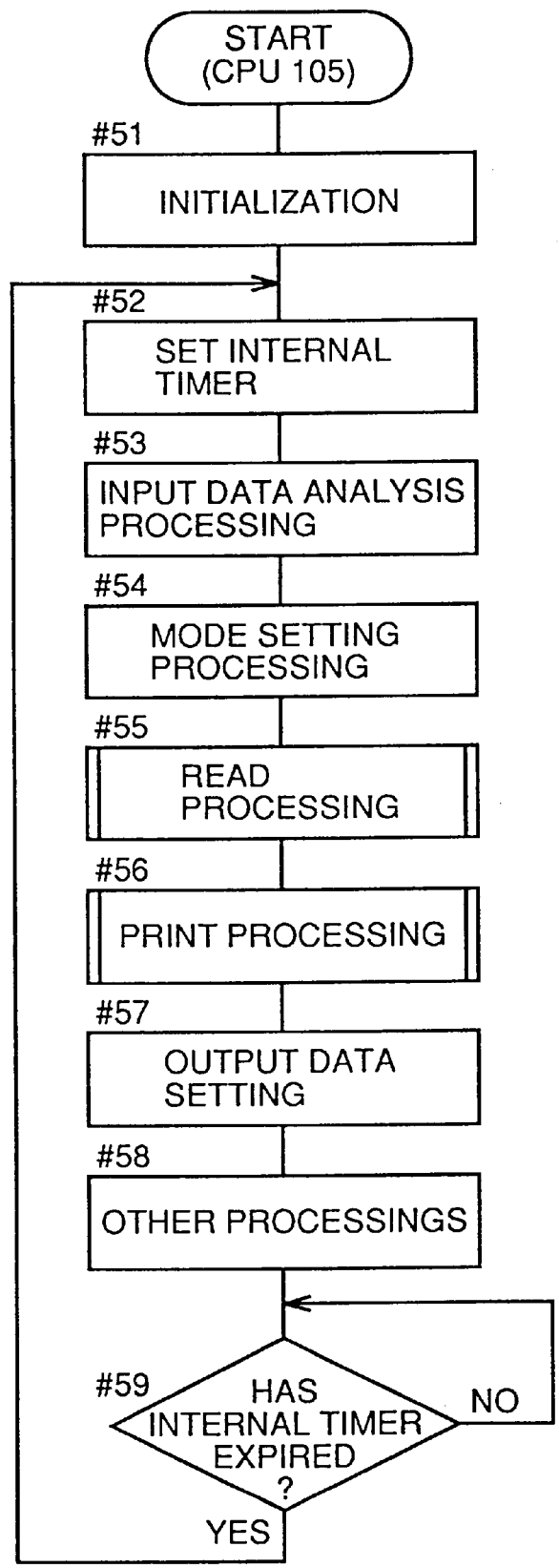
FIG. 9 is the main flow chart of CPU 105 according to the first embodiment.

The operation of the copying machine according to the first embodiment will now be more specifically described with reference to the flow charts. FIG. 9 shows the main flow chart of CPU 105 according to the first embodiment. CPU 105 provides initialization (#51), and then repeatedly performs setting an internal timer (#52), the input data analysis processing for checking input data from the other CPUs (#53), the mode setting processing for setting a mode of operation according to the content of a setting on the operation panel (#54), the read processing (#55), the print processing (#56), the output data setting processing for allowing a command to wait at a communication port (#57), other processings (#58) and checking whether the internal timer has expired (#59).

Figure 10:
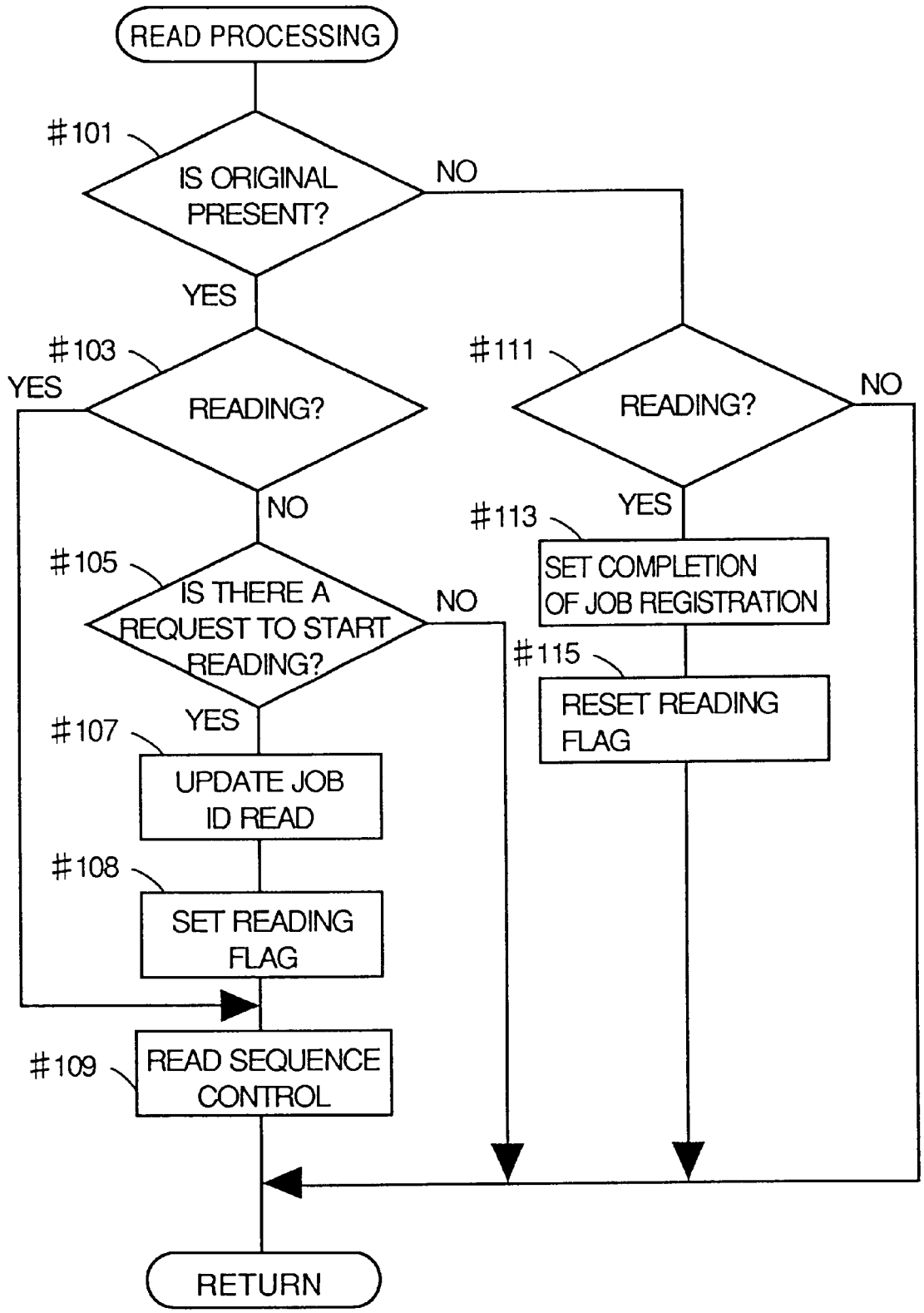
FIG. 10 is a flow chart of a read processing according to the first embodiment.

FIG. 10 shows a flow chart of the read processing according to the first embodiment. This processing provides a processing for registering a job by reading an original. First, whether or not an original is set is checked (#101). If any original is set, a decision is made on the current reading state (#103). If the original is not being read, a decision is made on whether a request to start reading has been received via operation panel OP (#105). If there is not a request to start reading, the reading processing is ended. If a request to start reading is present, a read job ID is updated (#107) and a flag for indicating that a reading is being performed is set (#108). When reading is being performed (YES at #103) or the flag for indicating that reading is being performed is set (#108), read sequence control is provided (#109). In the read sequence control, commands and reports are communicated with CPUs 106, 102 and 103, as described above. A plurality of originals are compressed for each page and image data are successively registered in the management table and the code memory.

If an original is not set (NO at #101), a decision is made on whether reading is being performed (#111). If reading is being performed, there remain no originals and thus a decision is made that the reading of the original is completed. Accordingly, the completion of a job registration is set in the aforementioned management table (#113), and the flag indicating that reading is being performed is reset (#115). If reading is not being performed (NO at #111), the read processing is ended.

Figure 11:
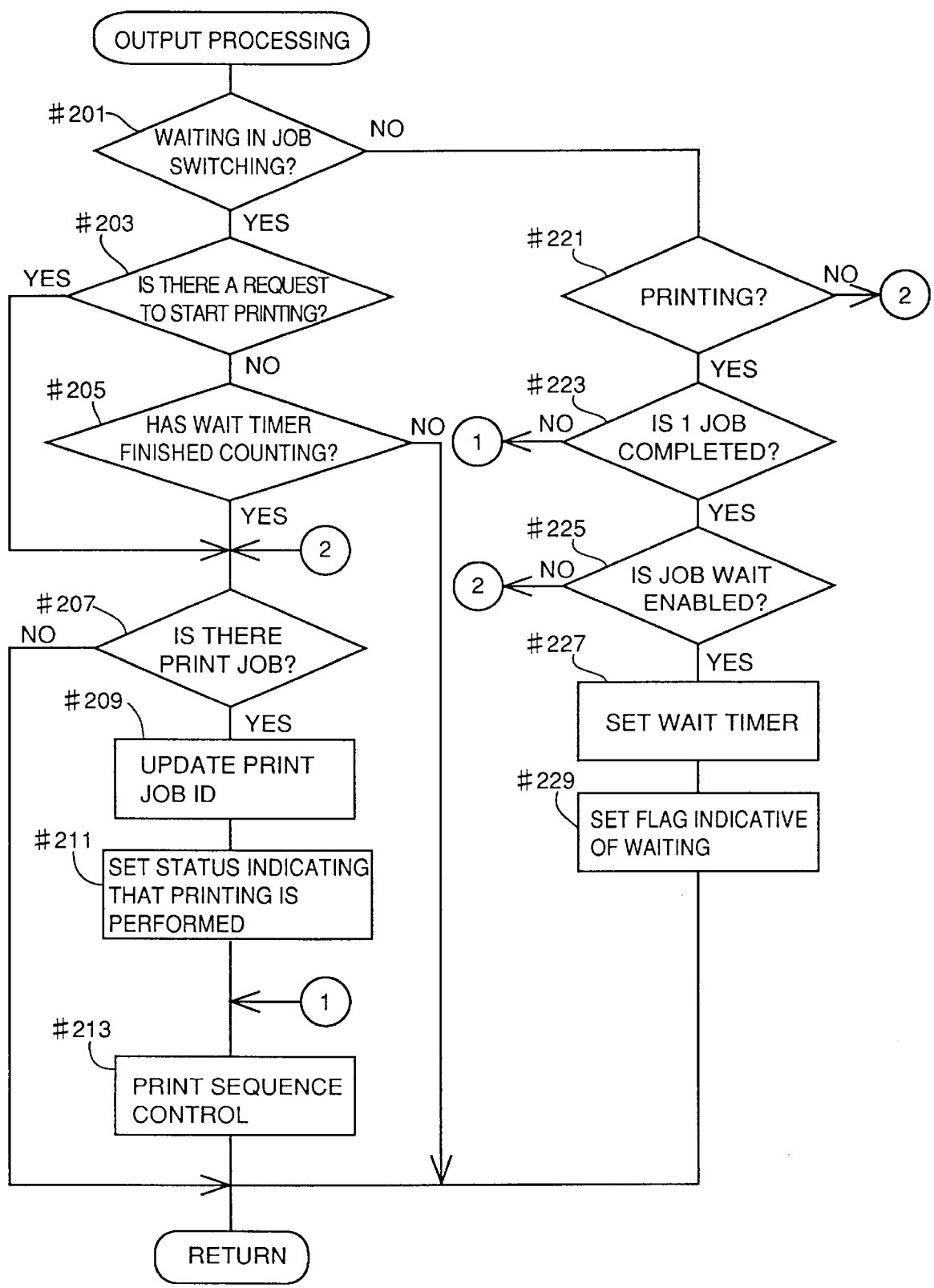
FIG. 11 is a flow chart of an output processing according to the first embodiment.

FIG. 11 shows a flow chart of an output processing according to the first embodiment. In the processing, the print operation for a print job waiting in the memory to be executed when the printing for the preceding print job is completed is delayed for a time period preset on operation panel OP. The delay processing will be referred to as a "wait operation" in describing FIG. 11.

First, a decision is made on whether a wait operation in job switching is being performed (#201). If a decision is made that a wait operation is not being performed, a decision is made on whether printing is being performed (#221). Note that the "printing is being performed" means the state until the printing processing for the image data of all the originals for a specific job to which a print operation is currently applied is completed.

If a decision is made that printing is being performed (#221), a decision is made on whether the job being printed is completed (#223). If a decision is made that the job is not completed, print sequence processing is continued (#213). When a decision is made that the job being printed is completed, a decision is made on whether enabling of a wait operation is preset on the operation panel (#225). If a decision is made that a wait operation is enabled, a wait timer is set to perform the wait operation (#227). The wait timer is similarly preset for a predetermined time period by means of the operation panel, and thus the time period is converted into a count value of an internal timer of CPU and is set accordingly. When the timer is set, a flag indicative of waiting is also set (#229).

Figure 12:
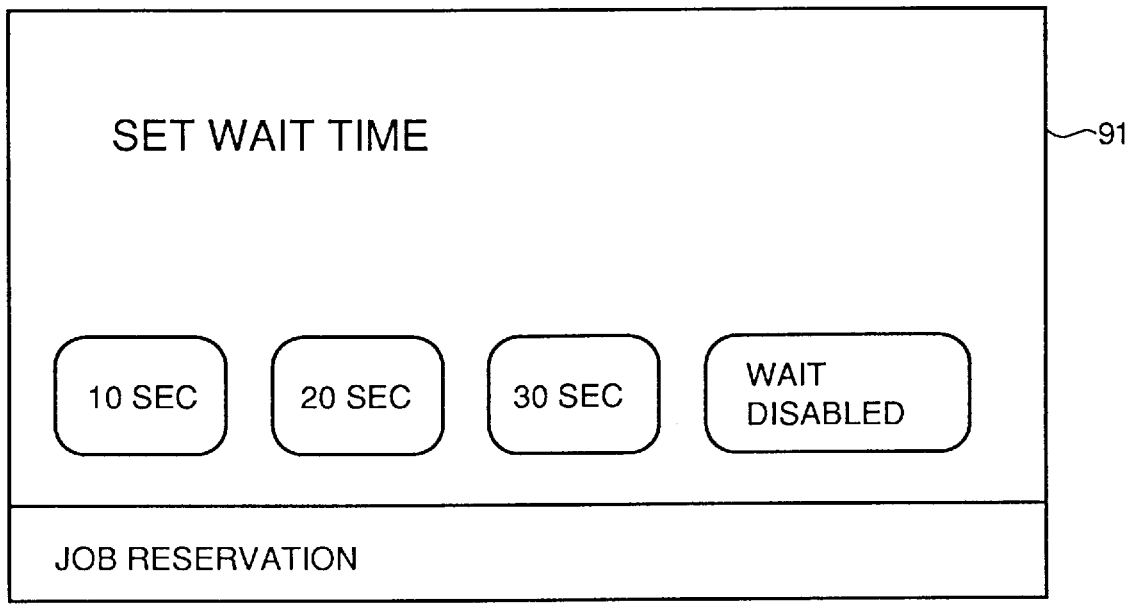
FIG. 12 is a plan view of the touch panel.

It should be noted that the time period for the wait timer is selected from a group of soft keys on a setting screen (shown in FIG. 12) that are displayed on touch panel 91 of operation panel OP. Displayed on the setting screen as the group of soft keys are a 10 SEC key for performing a wait operation for 10 seconds, a 20 SEC key for 20 seconds, a 30 SEC key for 30 seconds and a WAIT DISABLED key for printing the next job without performing a wait operation. This setting screen is displayed on touch panel 91 by pressing job reservation key on operation panel OP. Among these settings, "printing the next job without performing a wait operation" is initially set in the copying machine 1.

The set time period of the wait timer is not limited to the aforementioned specific time periods and may be any time period sufficient for the user to remove printed sheets.

When a decision is made that a wait operation is being performed in job switching (#201), a decision is made on whether there is a request to start printing (#203). This request is that by an operation input for forcibly canceling a wait operation being performed in job switching so as to start a job.

If there is not a request to start printing, a decision is made on whether the wait timer has finished counting (#205). If the wait timer has not finished counting, the outputting process is ended.

If a decision is made that there is a request to start printing (YES at #203), the wait timer finishes counting (YES at #205), a decision is made that printing is not being performed (NO at #221), or if a decision is made that a wait operation is not enabled (NO at #225), the management table is checked and a decision is made on whether there is a job to be printed (#207). If there is a job to be printed, a print job ID is updated (#209). Then, the status indicating that printing is being performed is set (#211), and the wait flag is reset if it is set. Print sequence control is then performed (#213). If there is not a job to be printed, the outputting processing is ended.

The processing described above allows outputting a new job to be started. As described above, the print sequence control provides the communication of commands and reports with CPUs 106 and 104 to successively read the image data of a plurality of originals from the code memory via the management table for each page and apply the decompression and print processings to the image data.

It is needless to say that while the timing of starting a print operation is delayed in the first embodiment, the timing of reading data from the memory can be delayed to achieve a similar effect.

Second Embodiment

Figure 13:
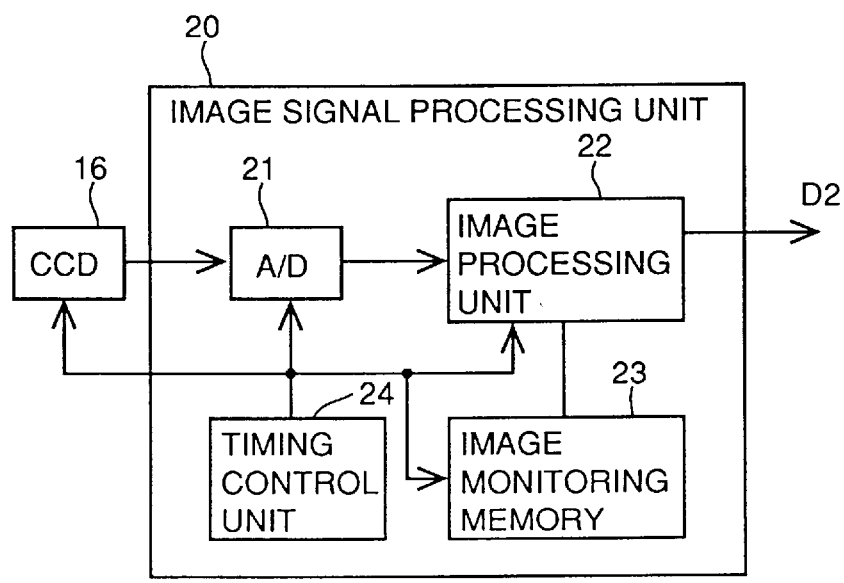
FIG. 13 is a block diagram of the image signal processing unit of a copying machine according to a second embodiment of the present invention.

FIG. 13 is a block diagram of the image signal processing unit of a copying machine according to a second embodiment. Image signal processing unit 20 includes an A/D (Analog/Digital) converter 21 for quantizing and converting a photoelectric conversion signal from image sensor 16 into image data, an image processing unit 22 for providing an image processing and outputting the processed image data as read information, an image monitoring memory 23 for storing sample data for shading correction, and a timing control unit 24 for outputting a signal for synchronizing the operations of these units with each other.

A/D converter 21 quantizes and converts a photoelectric conversion signal of image sensor 16 into 8-bit (256-tone) image data. Image processing unit 22 provides image processings, such as shading correction, MTF correction, gamma correction and zoom processing, and outputs the processed image data D2 as read information. Image monitoring memory 23 is used for storing sample data for shading correction and the like.

Figure 14:
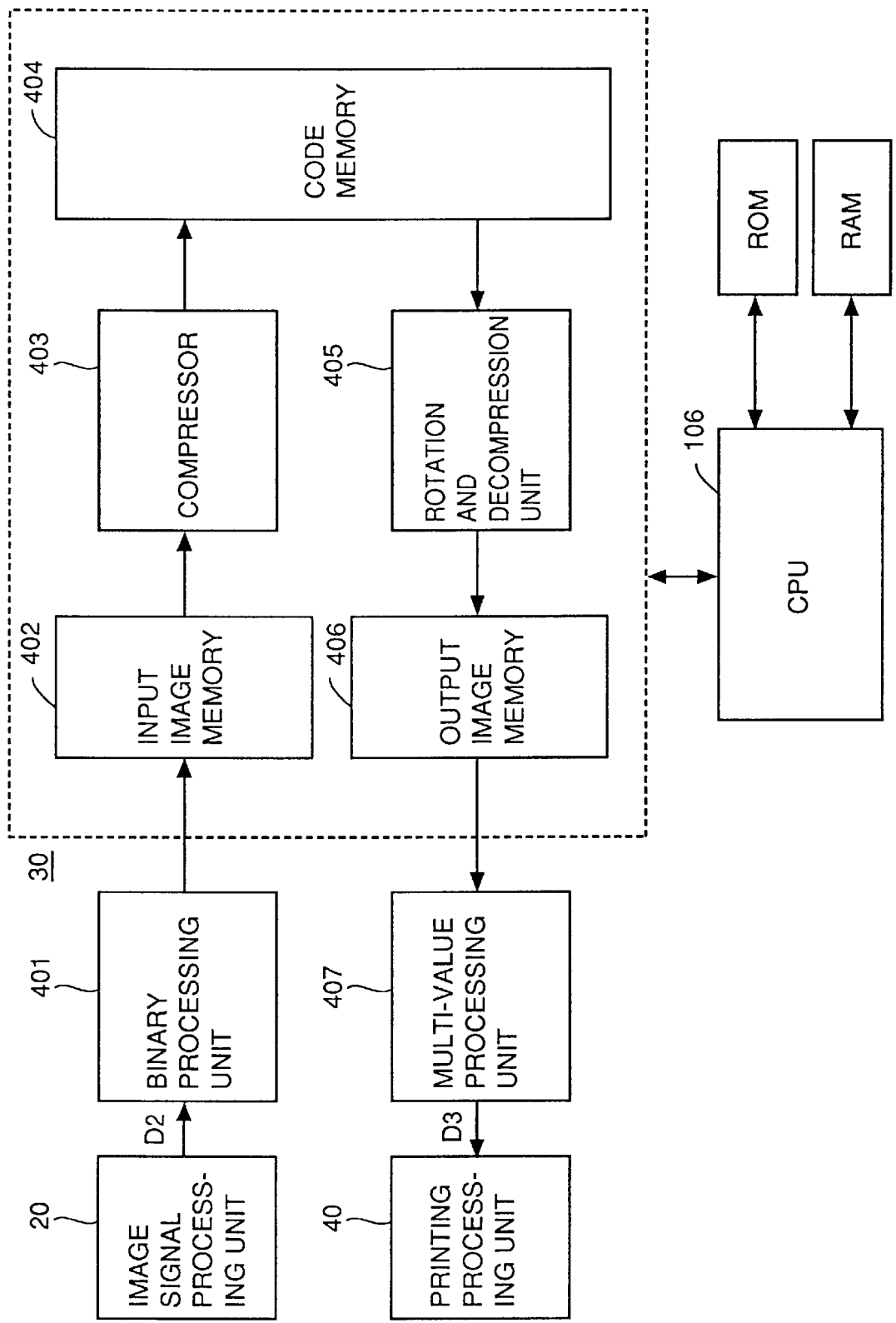
FIG. 14 is a block diagram showing a configuration of a memory unit according to the second embodiment.

FIG. 14 is a block diagram showing a configuration of the memory unit according to the second embodiment. Memory unit 30 according to the second embodiment includes a binary processing unit 401, an input image memory 402, a compressor 403, a rotation and decompression unit 405, a code memory 404, an output image memory 406, a multi-value processing unit 407, and CPU 106 for controlling them. Memory unit 30 compresses and stores image information so as to economize the capacity of the memory. Input image memory 402 and output image memory 406 each have a capacity capable of storing the image data when an original of A3 size is read and output at a resolution of 400 dpi (dots per inch).

In temporarily storing an image read by scanning an original, binary processing unit 401 of memory unit 30 receives 8-bit image data D2 from image signal processing unit 20. Binary processing unit 401 converts multi-valued image data D2 into binary image data, for example by error diffusion. The binarized image data is temporarily written into input image memory 402.

Compressor 403 reads and compresses the image data written in input image memory 402 to produce coded data (compressed data) which is written into code memory 404. Rotation and decompression unit 405 reads and decompresses coded data to be printed from code memory 404, applies rotation to the resultant image data, as required, and writes the image data into output image memory 406. Note that compressor 403 and rotation and decompression unit 405 can operate independent from each other and in parallel so that copying rate is improved. Data between compressor 403 and rotation and decompression unit 405, and code memory 404 are each DMA-transferred by a DMA controller (not shown).

When image data of one page is reproduced by decompression, the data is read from output image memory 406 and is restored to a multi-valued image at multi-value processing unit 407. The multi-valued image data is transferred as exposure control data to printing processing unit 40.

FIGS. 15A and 15B represent the management table showing a relation between jobs and the code memory according to the second embodiment. Code memory 404 is divided into memory regions by 32 kilo-bytes and each region stores the coded data for each page to allow for simultaneous control of write (in reading) and read (in printing).

Management table MT1 stores the number indicative of a region of code memory 404, the page number PN of image data (the number of an image of an original) applied in the writing order (in the original scanning order), the number of a region linked (forward linkage and backward linkage), and various additional information required for compression and decompression, such as compression method, data length and the like. According to the information, CPU 106 dynamically controls code memory 404.

The "FW linkage" in FIG. 15A indicates the forward linkage of a region for every 32 kilo-bytes in each page. When it is "00", it represents the first region for storing data of one page. When it is not "00", it represents the number of a region linked in the forward direction. The "BW linkage" similarly indicates the backward linkage of a region for every 32 kilo-bytes. When it is "FF", it represents the last region. When it is not "FF", it represents the number of a region linked in the backward direction.

In reading and compressing image data from input image memory 402, CPU 106 forms information for management table MT1 while controlling compressor 403 and storing compressed image data into code memory 404. In outputting image data, the opposite operation is performed to read coded data from code memory 404. The information in management table MT1 is erased when the information of a page of interest is normally read and the number of sheets (copies) that is designated by the operator are copied.

Figure 16:
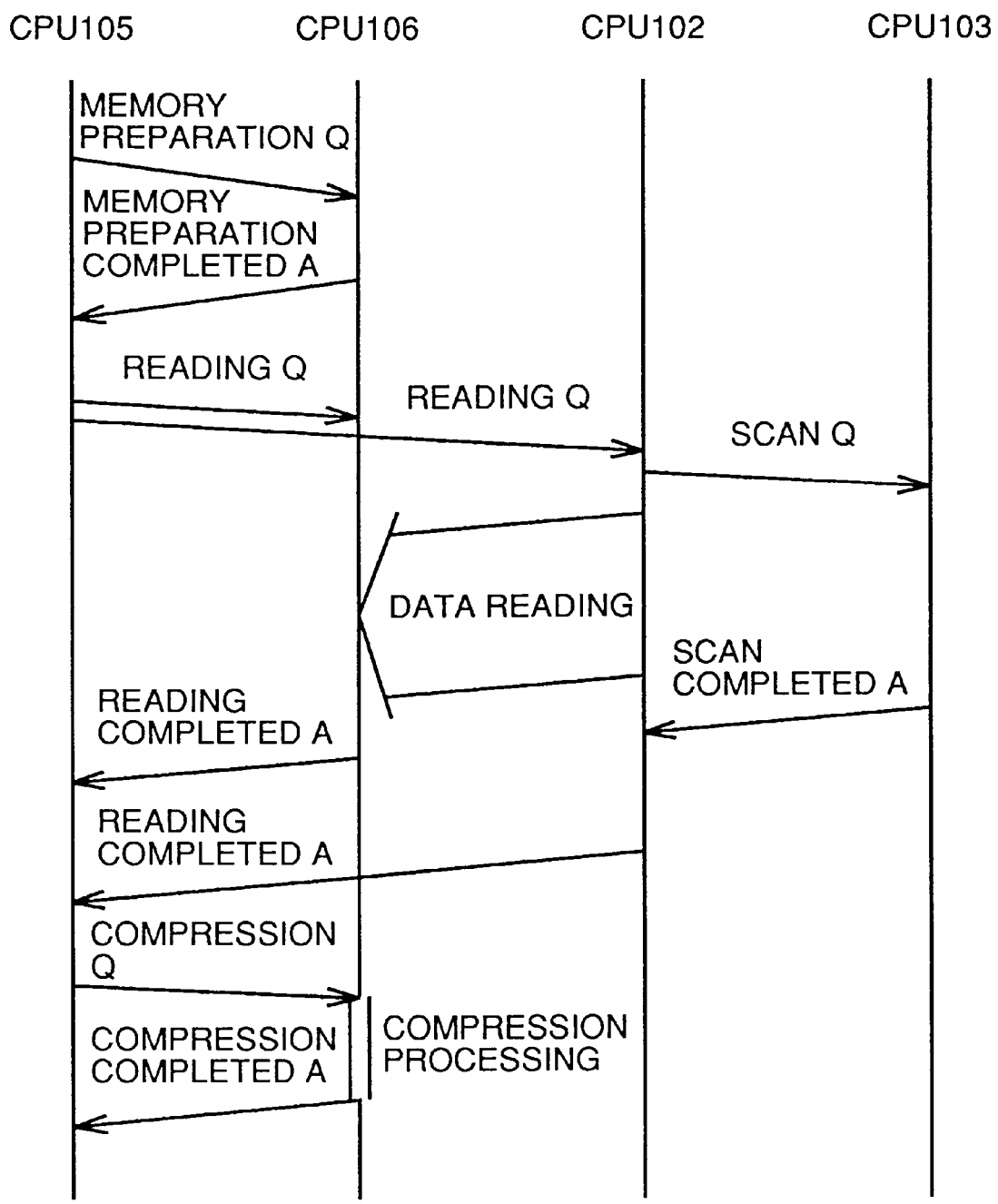
FIG. 16 illustrates a schematic sequence of an original read operation according to the second embodiment.

The operation sequence of copying machine 1 in original reading and printing according to the second embodiment will now be described mainly with respect to the request commands (Q), reports (A) and data stream communicated among CPUs 101–106. FIG. 16 shows a schematic sequence of the original read operation according to the second embodiment. In the original read operation, image data is transferred from image signal processing unit 20 to memory unit 30.

First, CPU 105, which controls the general sequence, requests to CPU 106 for memory preparation. Responsively, CPU 106 sets for an internal hardware a bus connection state for transferring image data D2 from image signal processing unit 20 to memory unit 30.

When the setting is completed and the preparation is thus completed, CPU 106 signals to CPU 105 that memory preparation is completed. When CPU 105 requests to CPUs 106 and 102 for reading, CPU 102 requests to CPU 103 for scanning.

CPU 103 starts scanning and by way of scanner 19 image data is transferred by image sensor 16 to image processing unit 20. Then, according to an image processing mode set by CPU 102, read data (image data D2) is transferred from image signal processing unit 20 to memory unit 30.

When the scanning is completed and CPUs 102 and 106 signal to CPU 105 that the reading is completed, CPU 105 requests to CPU 106 for data compression. CPU 106 responsively initiates various portions, as described above. This allows the compression processing and compressed data is stored into code memory 404. When the compression processing is completed, CPU 106 signals to CPU 105 that a compression is completed.

Figure 17:
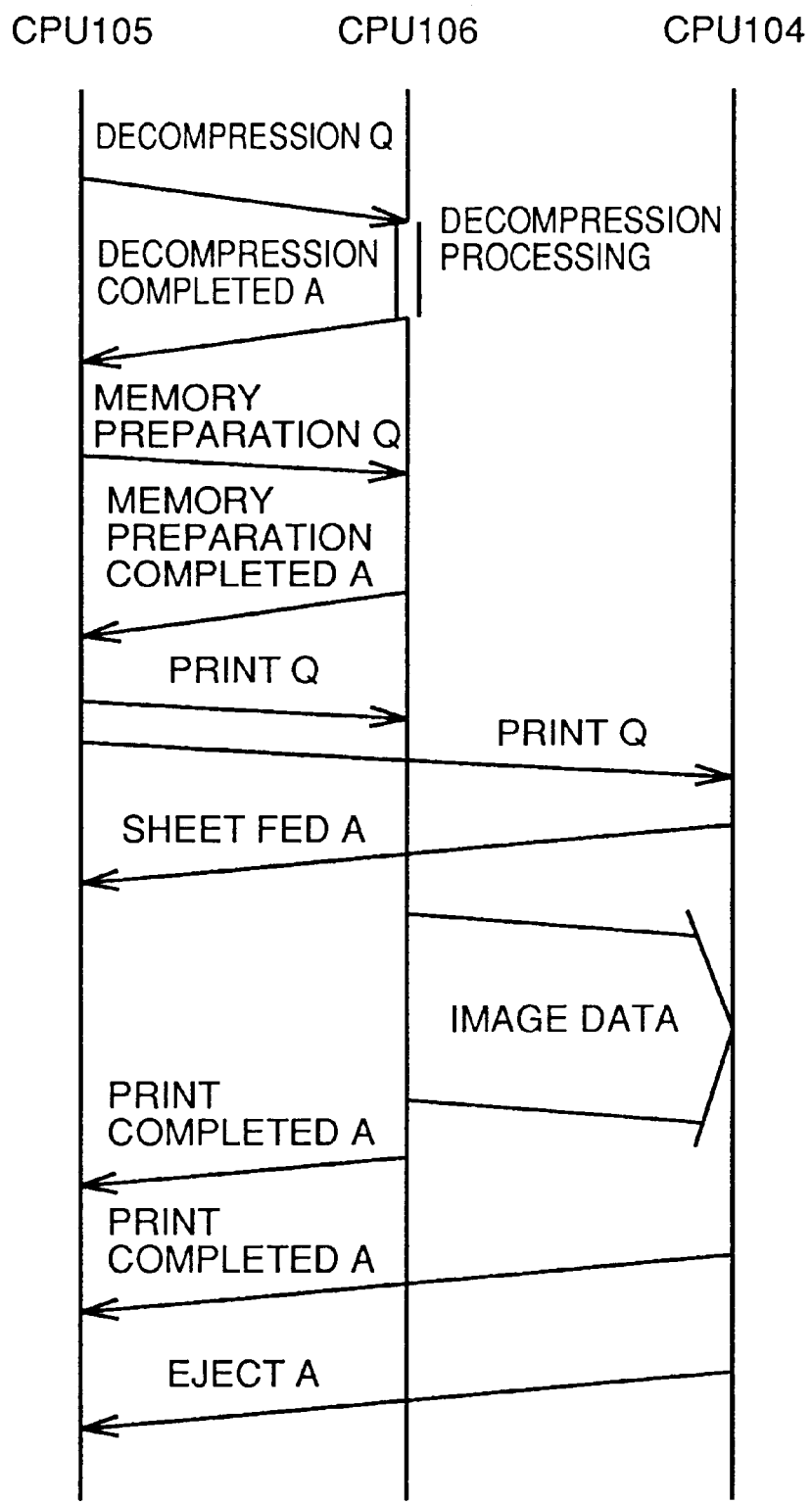
FIG. 17 illustrates a schematic sequence of a print operation according to the second embodiment.

FIG. 17 shows a schematic sequence of the print operation according to the second embodiment. In the print operation, image data is read from code memory 404 and a copied image is printed on a sheet according to the image data.

CPU 105 requests to CPU 106 for data decompression. CPU 106 initiates various portions, as described above. A decompression processing is thus performed and image data is written into output image memory 406. Then, CPU 106 sends to CPU 105 a report that the decompression is completed.

When the decompression processing is completed, CPU 105 requests to CPU 106 for memory preparation so as to read the image data from output image memory 406. Responsively CPU 106 sets for the internal hard ware the bus connection state for transferring image data D3 from output image memory 406 to printing processing unit, the rotation processing and the like. Then, CPU 106 sends to CPU 105 a report that a memory preparation is completed.

When these processings and hence the preparation are completed and CPU 105 is signaled accordingly, CPU 105 requests to CPUs 106 and 104 for printing out. CPU 104 sends to CPU 105 a sheet-feeding report for informing CPU 105 of the transport state of a sheet. Then, image data D3 read from output image memory 406 is output to printing processing unit 40 and printing out is performed.

When the printing out is completed, CPUs 106 and 104 send to CPU 105 a report that the printing is completed and a report that eject is completed. When CPU 105 receives these reports, CPU 105 provides a memory clear request to CPU 106, as required.

Referring to the flow charts, an operation of the copying machine according to the second embodiment will now be more specifically described.

Figure 18:
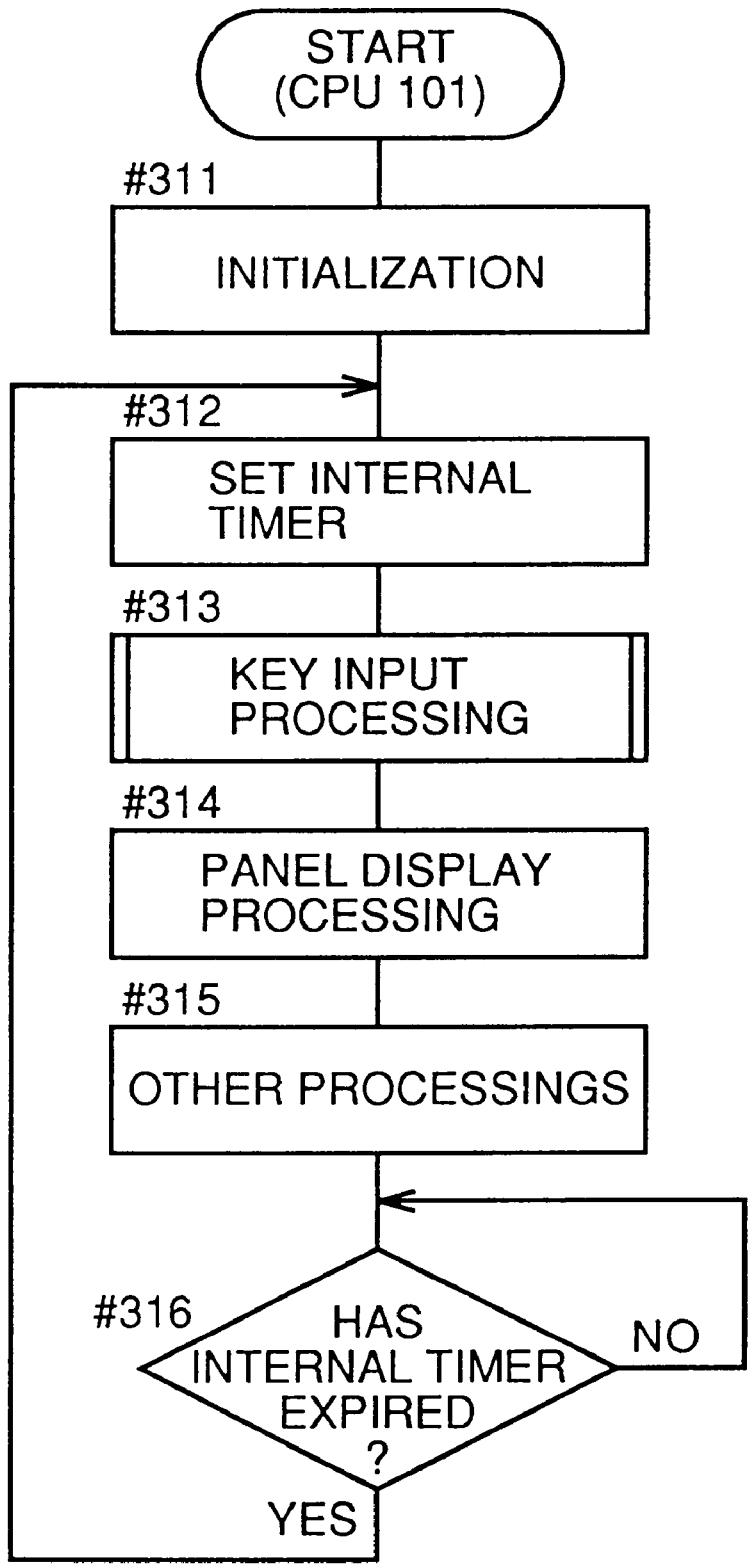
FIGS. 18, 19, 20 and 21 are the main flow charts of programs executed by CPUs 101, 104, 105 and 106 according to the second embodiment, respectively.

FIG. 18 is the main flow chart of a program executed by CPU 101 that controls the operation panel according to the second embodiment. Upon power-on, CPU 101 first performs a initialization processing for initializing RAM 121, a register and the like (#311). Then, CPU 101 repeatedly performs the processing for setting an internal timer which defines the length of one routine (#312), the key input processing for accepting key operations (#313), the panel display processing for displaying according to operations (#314), other processings (#315) and checking whether the internal timer has expired (#316). Furthermore, communications with the other CPUs as an interruption processing are appropriately performed.

Figure 19:
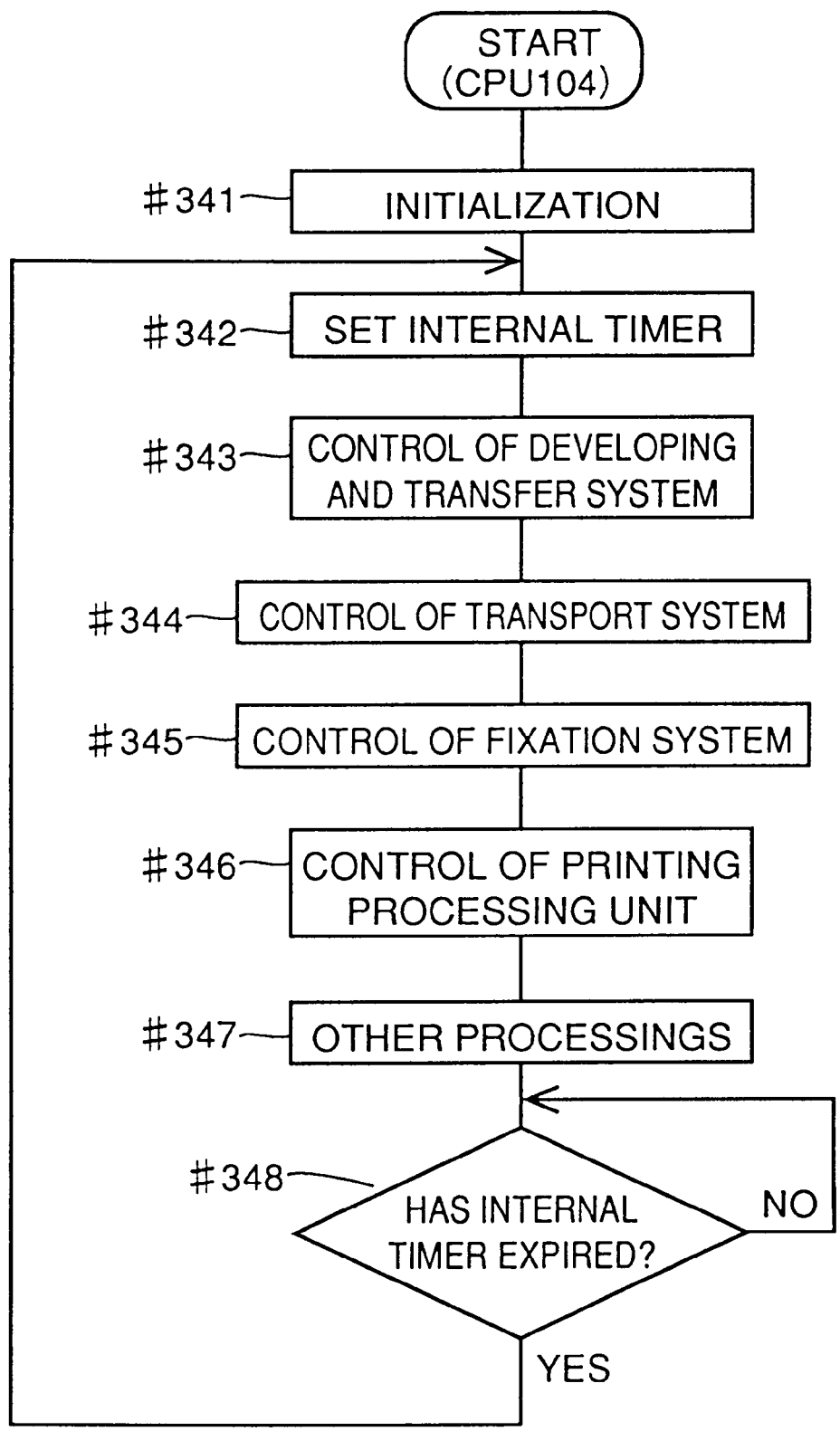

FIG. 19 is the main flow chart of a program executed by CPU 104 that controls page printer PRT according to the second embodiment. CPU 104 first performs the initialization processing (#341), and then repeatedly performs the processing for setting an internal timer (#342), the processing for controlling the developing and transfer system (#343), the processing for controlling the transport system (#344), the processing for controlling the fixation system (#345), the processing for controlling the printing processing unit (#346), other processings (#347) and checking whether the internal timer has expired (#348).

Figure 20:
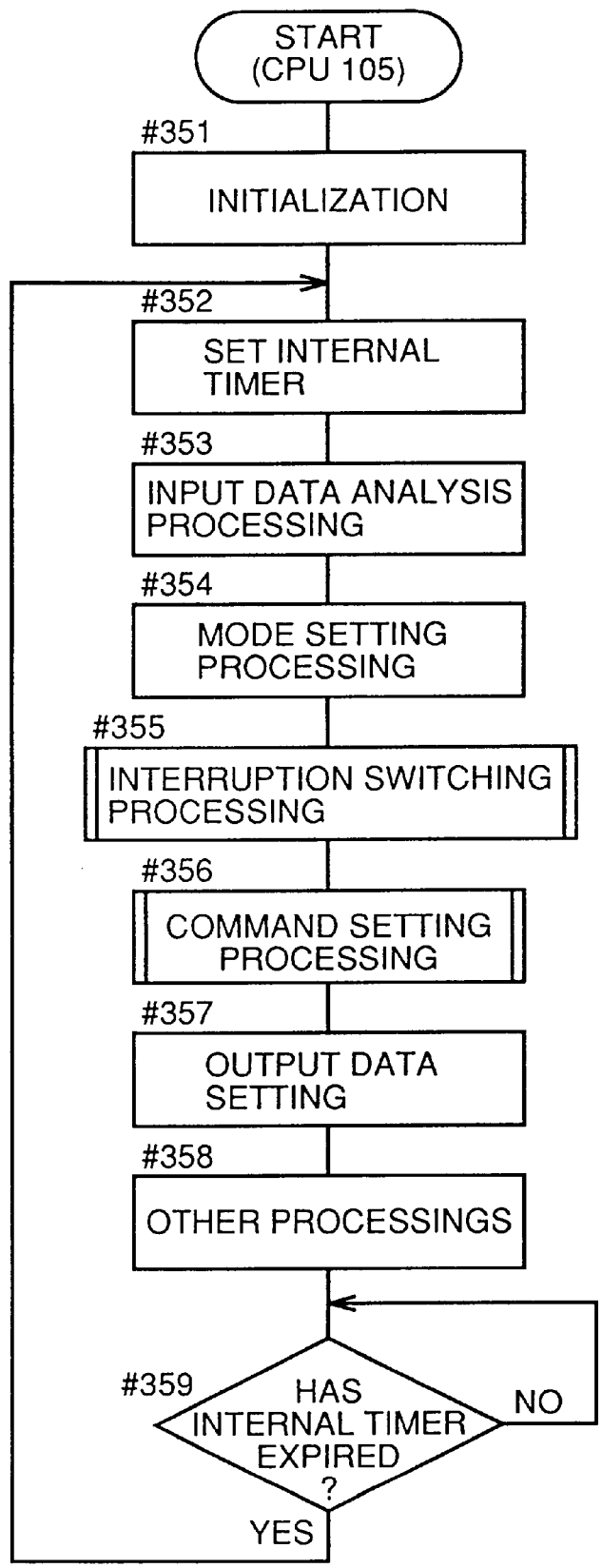

FIG. 20 is the main flow chart of a program executed by CPU 105 that provides the general timing control for control unit 100 according to the second embodiment. CPU 105 performs the initialization processing (#351), and then repeatedly performs the processing for setting an internal timer (#352), the input data analysis processing for checking input data from the other CPUs (#353), the mode setting processing for setting a mode of operation according to the content of a setting on the operation panel (#354), the interruption switching processing (#355), the command setting processing according to modes (#356), the output data setting processing for allowing a command to wait at a communication port (#357), other processings (#358), and checking whether the internal timer has expired (#359).

Figure 21:
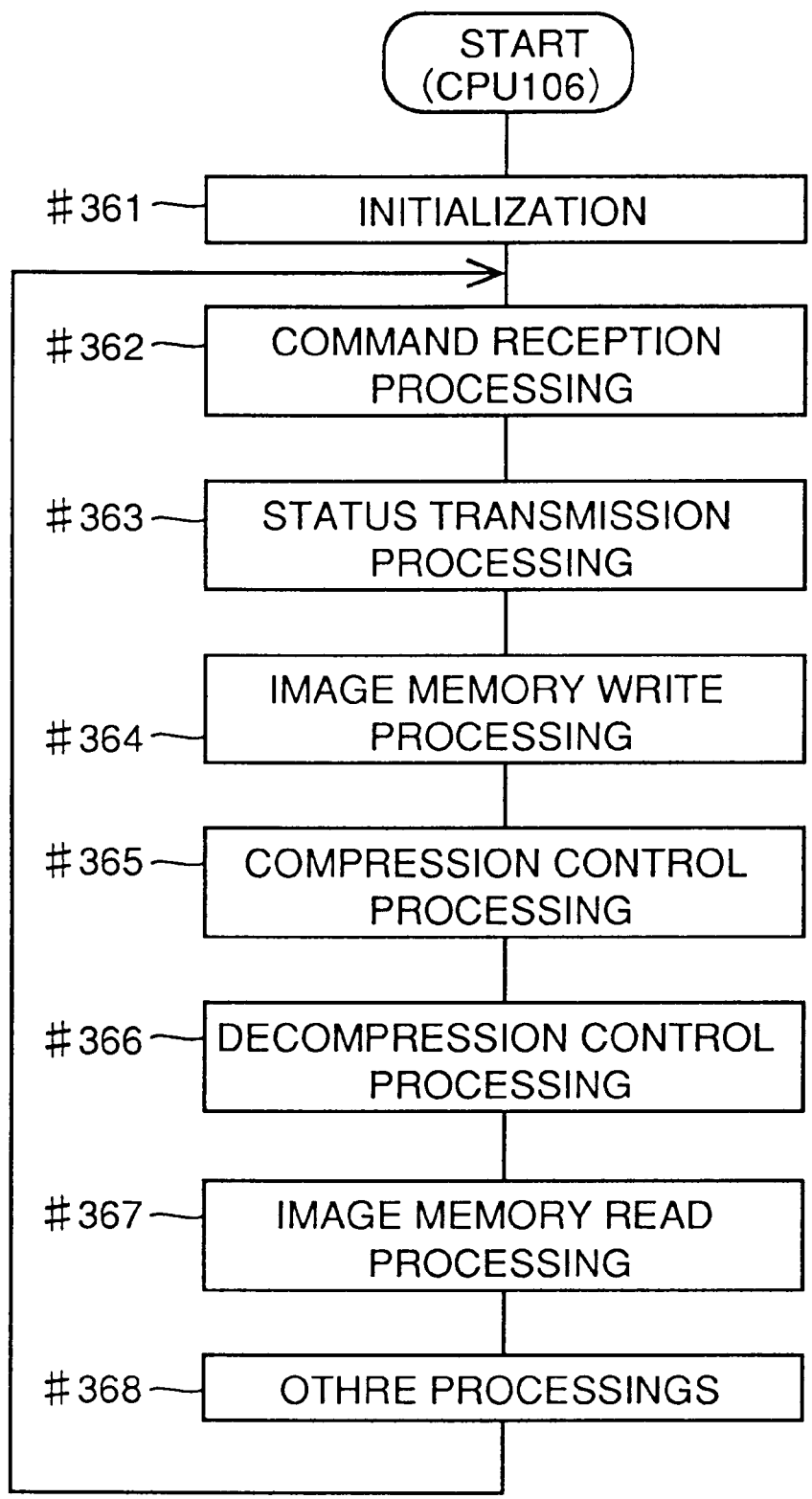

FIG. 21 is the main flow chart of a program executed by CPU 106 that controls the storing and reading of image information according to the second embodiment. Referring to FIG. 21, CPU 106 performs the initialization processing (#361), and then repeatedly performs the command reception processing (#362), the status transmission processing (#363), the image memory write processing (#364), the compression control processing (#365), the decompression control processing (#366), the image memory read processing (#367), and other processings (#368).

Figure 22:
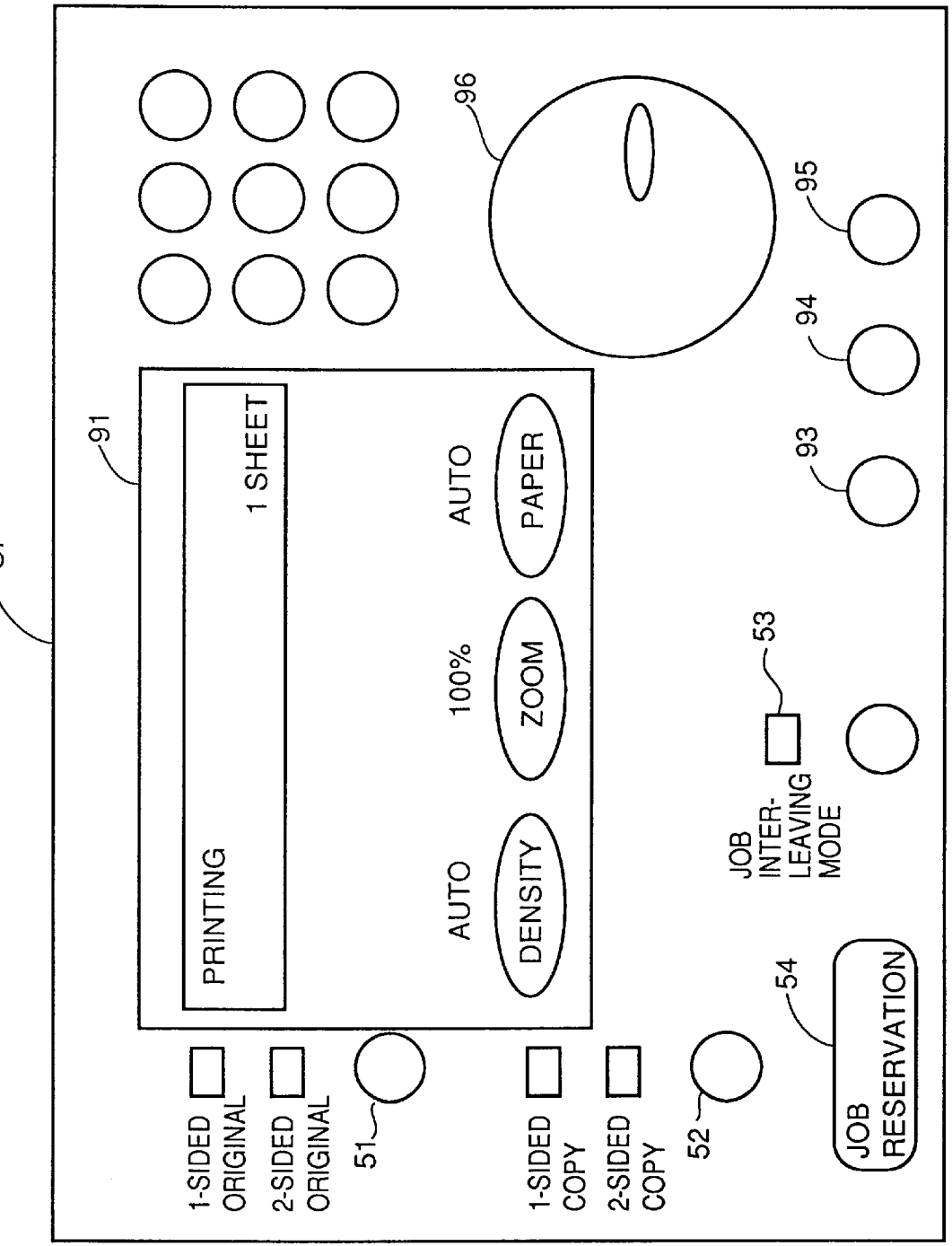
FIGS. 22–24 show screen controls of the operation panel of the copying machine according to the second embodiment.
Figure 23:
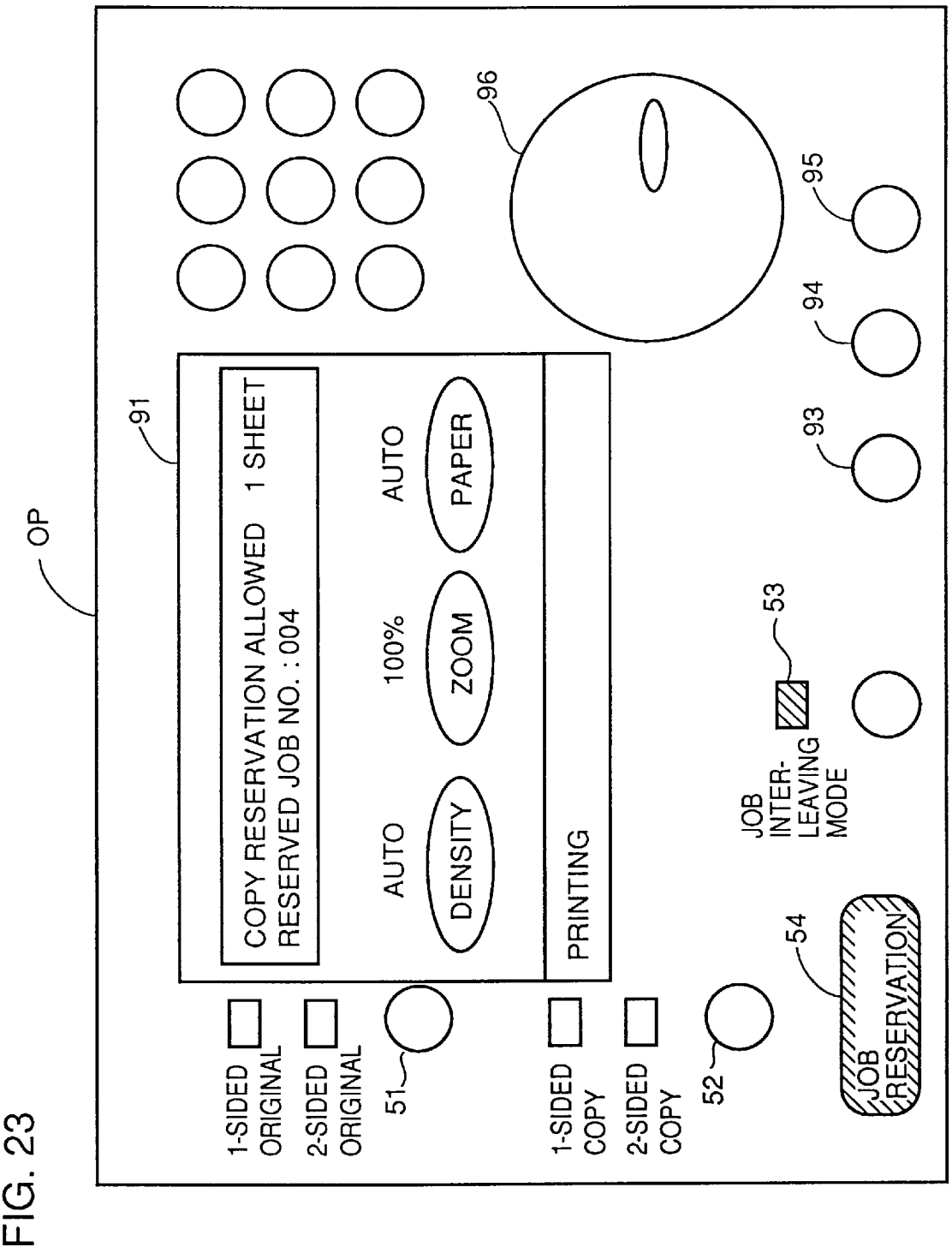
Figure 24:
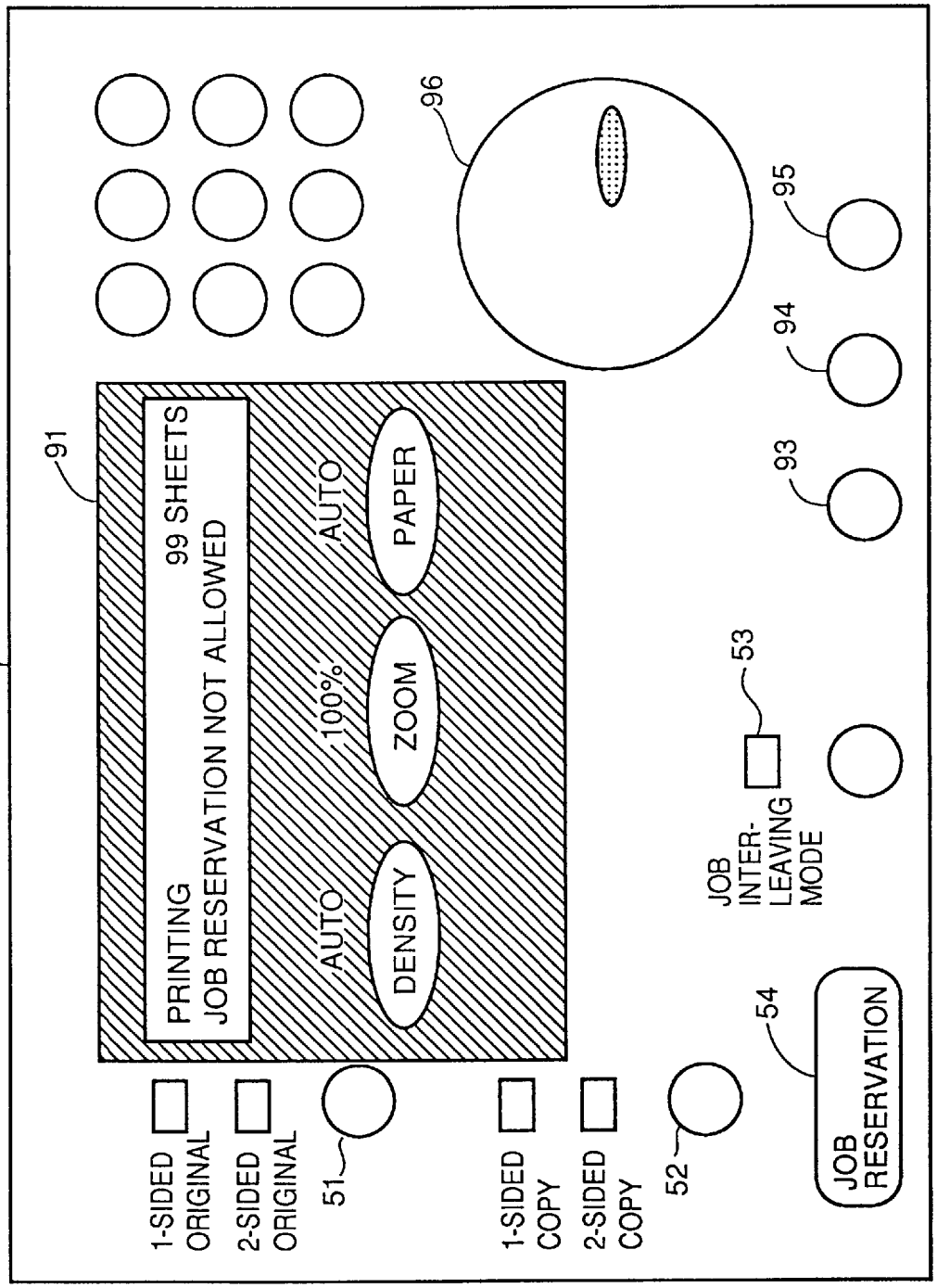
Figure 25:
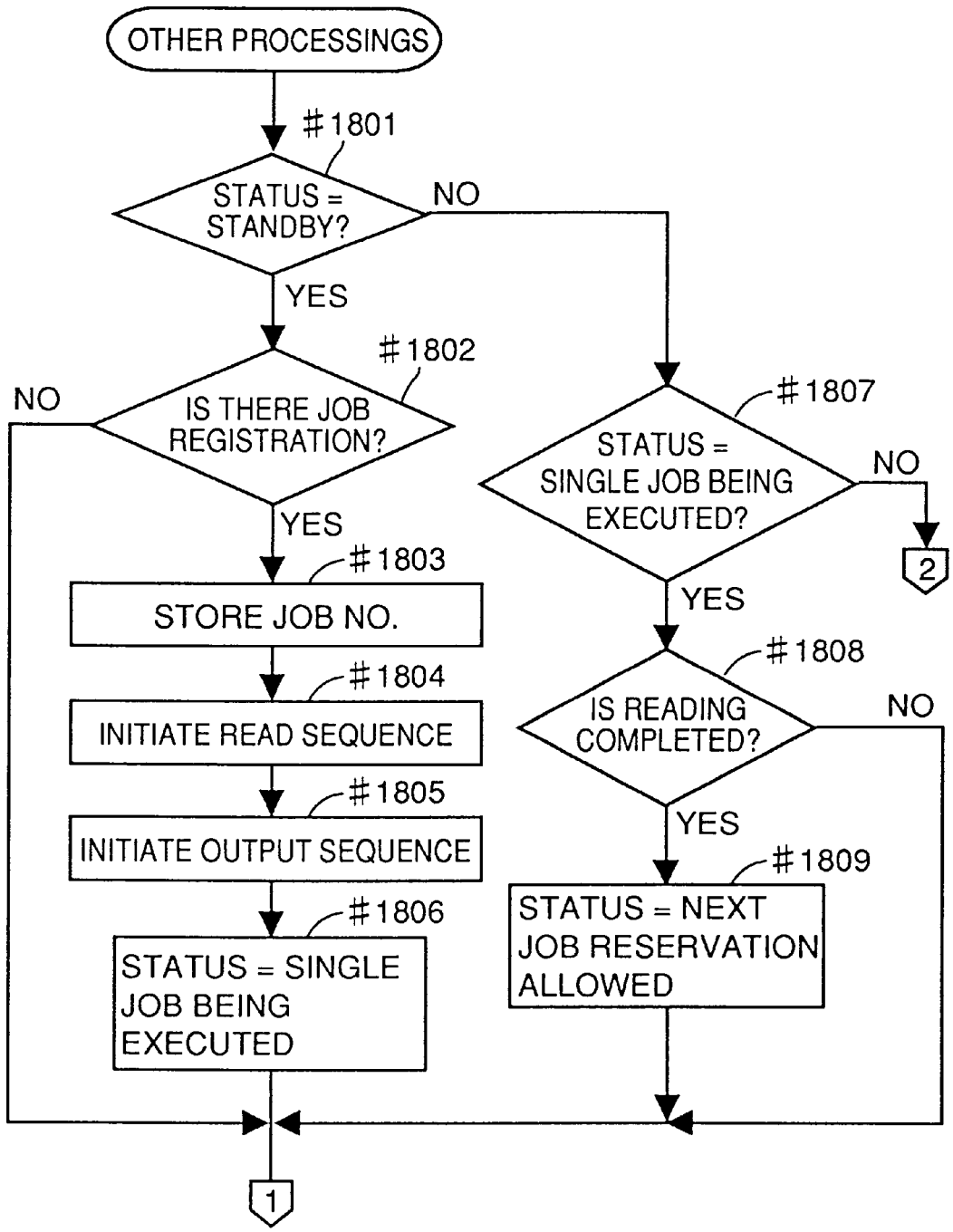
FIGS. 25–29 are flow charts for illustrating a procedure of the interleaving processing according to the second embodiment.
Figure 26:
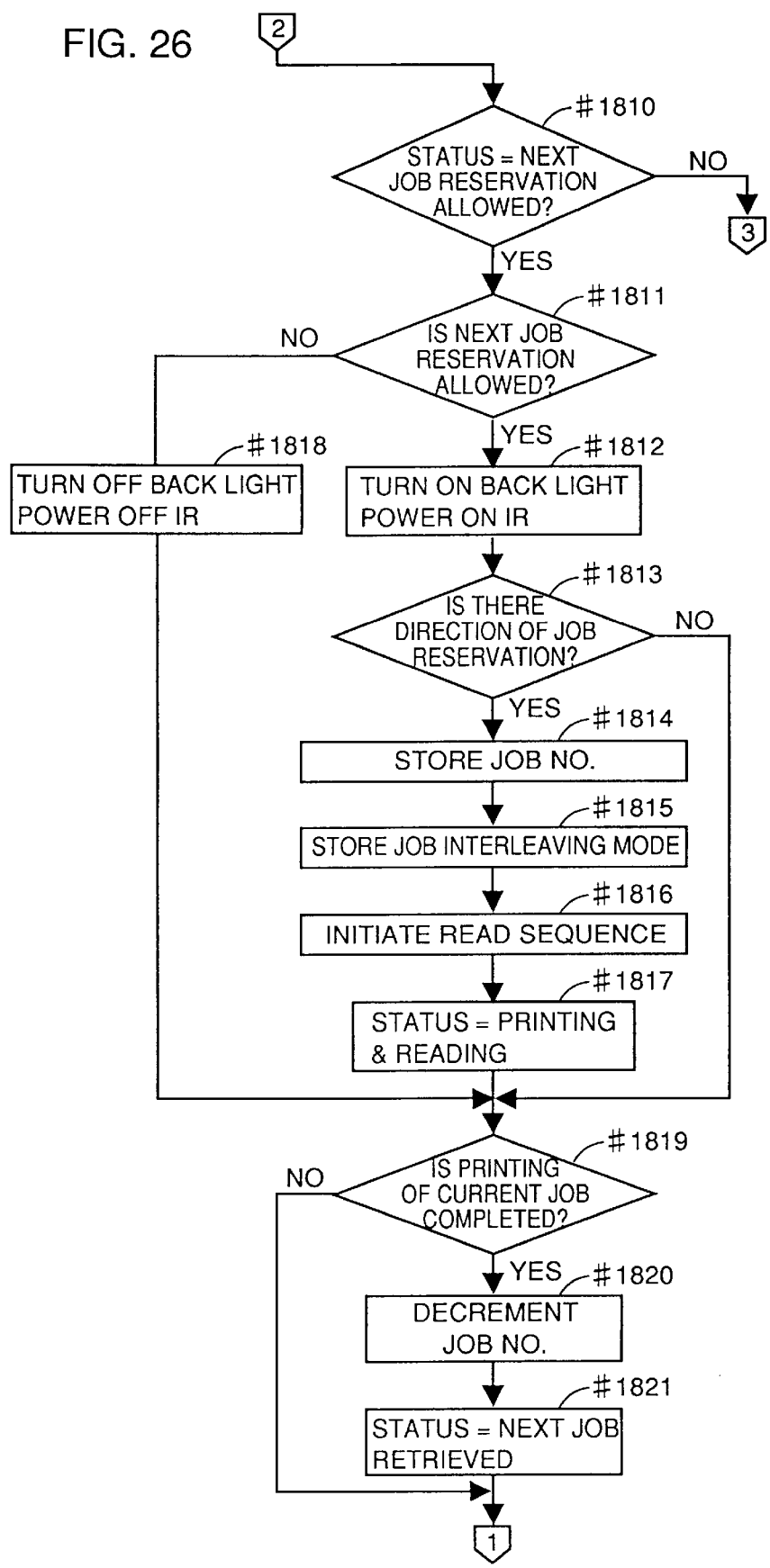
Figure 27:
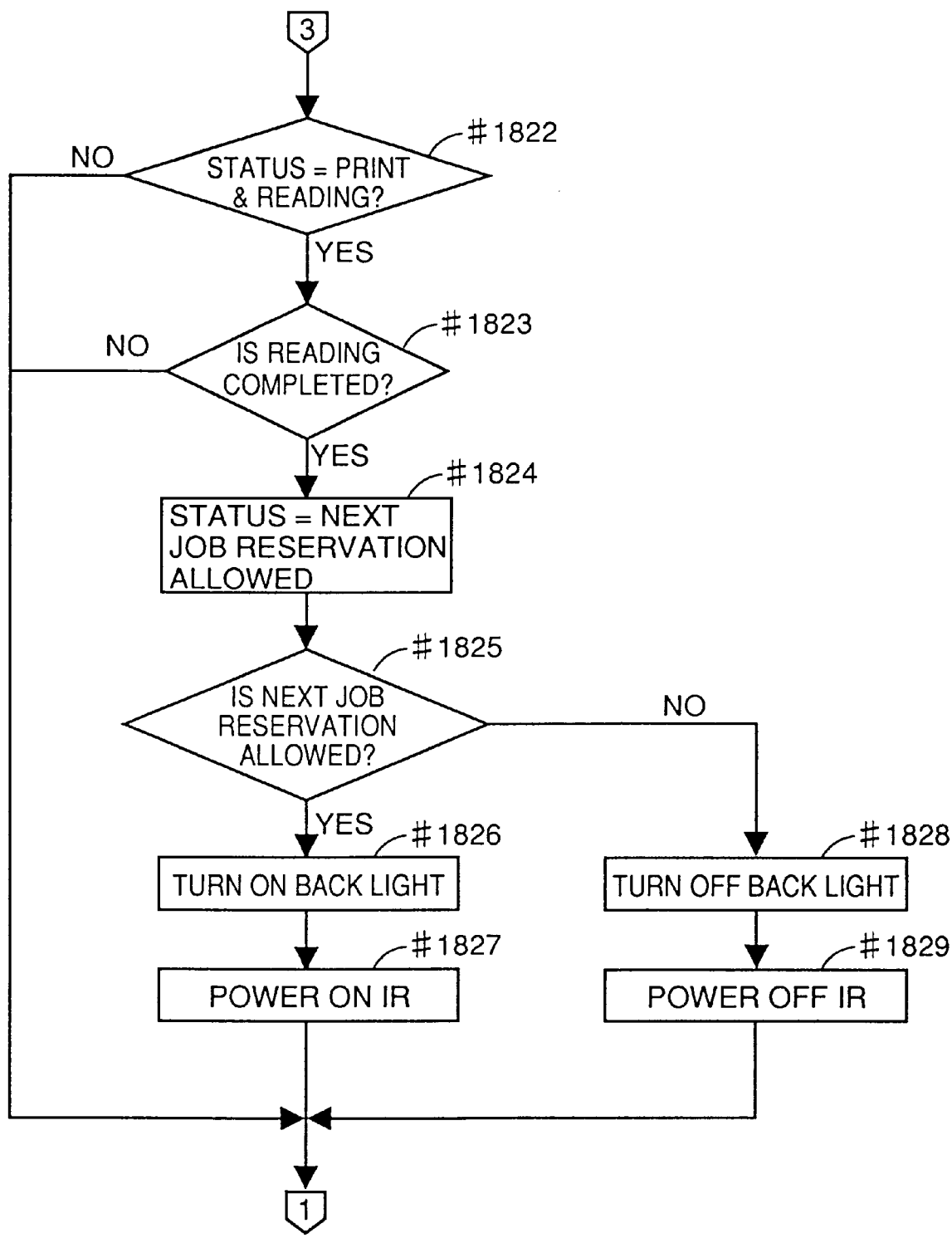
Figure 28:
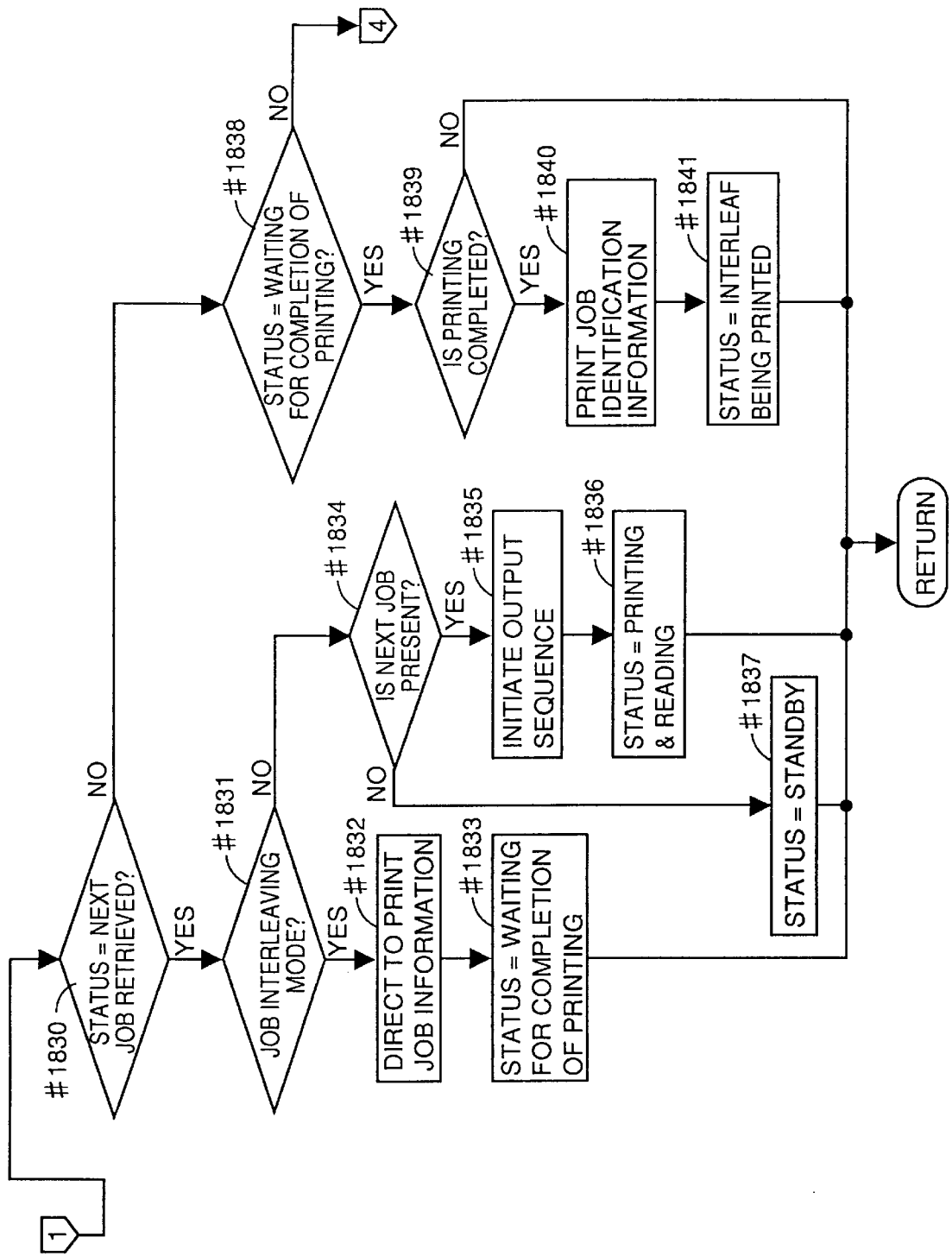
Figure 29:
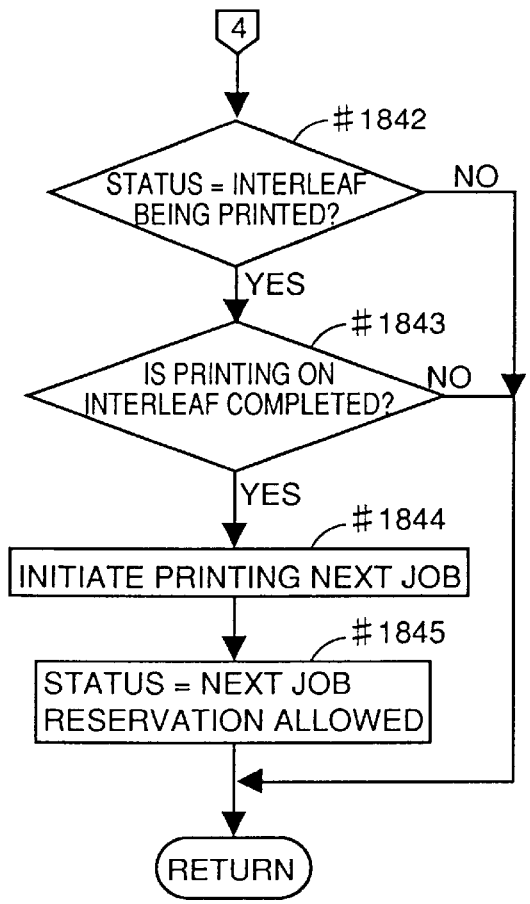

Panel control for the copying machine according to the second embodiment will now be described with reference to FIGS. 22–24. FIGS. 22–24 are views for illustrating the control of the screen on operation panel OP of the copying machine according to the second embodiment. In the normal state, the copying machine according to the second embodiment displays "READY TO COPY", as shown in FIG. 2. When originals are set and a mode of operation is set and then start key 96 is pressed, copying is started. Then, touch panel 91 is switched to the indication "COPYING", as shown in FIG. 22. In this state, the copying machine operates with the copying as a single job. When all the originals are read and can thus be removed from the machine and then job reservation key 54 is pressed, the screen shifts to a screen which provides an indication that an additional job reservation is allowed together with a reserved job number (FIG. 23). In the job reservation state, a new reservation job is accepted each time when start key 96 is pressed according to the operation similar to that for the aforementioned single copy. The accepted job is assumed to be registered when job reservation key 54 is pressed.

It should be noted that the number of jobs which can be reserved is limited due to the capacity of the memory, and accordingly the quantity of light of touch panel 91 is reduced to darken touch panel 91 when any more job cannot be reserved. The operator can thus be notified of the condition that a new job cannot be accepted (FIG. 24).

The procedure of the interleaf processing will now be described with reference to FIGS. 25–29. FIGS. 25–29 is a flow chart of the interleaf processing according to the second embodiment. This processing is performed in the other processings in the main flow chart of CPU 104 described in FIG. 19 (#347). The statuses used in the flow charts will now be described. The status "STANDBY" is set when image reader IR and page printer PRT provide neither image reading nor print operation and no job reservation is made. This status is set in initialization. The status "SINGLE JOB BEING EXECUTED" is set when image reader IR performs image reading for a job while page printer PRT has not yet performed the print operation for the job and another job is not registered. The status "NEXT JOB RESERVATION ALLOWED" is set when image reader IR completes the image reading for a job. The status "NEXT JOB RETRIEVED" is set when the printing of the current job is completed. The status "WAITING FOR COMPLETION OF PRINTING" is set when the printing of the current job in the job interleaving mode is completed and the data to be printed on an interleaf is developed into image data. The status "INTERLEAF BEING PRINTED" is set when the data to be printed is printed on an interleaf. The status "PRINT & READING" is set when the current job in the job interleaving mode is completed and the next job is present.

As a processing in the flow chart, a decision is first made on whether the status is "STANDBY", "SINGLE JOB BEING EXECUTED", "NEXT JOB RESERVATION ALLOWED", "PRINT & READING", "NEXT JOB RETRIEVED", "WAITING FOR COMPLETION OF PRINTING" or "INTERLEAF BEING PRINTED" (#1801, #1807, #1810, #1819, #1825 #1832, #1836).

When the status is "STANDBY" (YES at #1801), a decision is made on whether there is a job registration based on the presence/absence of print key input from operation panel OP (#1802). When a decision is made that there is not any job registration (NO at #1802), the aforementioned decision is repeatedly made to identify the set status. If a decision is made that there is a job registration (YES at #1802), the job number is stored (#1803), a read sequence for providing image reading is initiated (#1804), an output sequence for printing the read image is initiated (#1805) and the processing for changing the status to "SINGLE JOB BEING EXECUTED" is then provided (#1806).

When the status is "SINGLE JOB BEING EXECUTED" (YES at #1807), the control waits for the reading of all the images for the current job to be completed and then changes the status to "NEXT JOB RESERVATION ALLOWED". In other words, when the reading of all the images for the current job is completed, image reader IR can read the images of the next job and accordingly the aforementioned status change is made.

It should be noted that the status "NEXT JOB RESERVATION ALLOWED" is set independently of the content managed in the management table. More specifically, even if there does not remain capacity in the memory that stores an additional job, the status "NEXT JOB RESERVATION ALLOWED" is unconditionally set when image reader IR completes the reading of all the images for the current job.

When the status is "NEXT JOB RESERVATION ALLOWED" (YES at #1810), the management table is retrieved to determine whether an additional job reservation is allowed (#1811). If it is allowed, the back light of touch panel 91 is turned on and image reader IR is powered on (#1812). It should be noted that the processing at step #1812 is provided only when the back light and the power supply of image reader IR are in off state. Then, a decision is made on whether there is a job reservation through operation panel OP (#1813). If a decision is made that a reservation is present (YES at #1811), the job number is stored (#1814), the job interleaving mode is stored (#1815), the read sequence is initiated (#1816), the output sequence is initiated (#1817) and the control then goes to step #1819. If a decision is made at step #1811 that there is not any reservation, the control skips the processings at steps #1814–#1817 to step #1819. If a decision is made at step #1811 that an additional job reservation is not allowed, the back light of touch panel 91 is turned off and image reader IR is powered off at step #1818 to prohibit panel input by the operator and then the control skips to step #1819. If should be noted that the processing at step #1818 is performed only when the back light and the power supply of image reader IR are in on state.

At step #1819, a decision is made on whether the printing for the current job is completed. If it is completed, the job number is decremented at step #1820 and the processing for changing the status to "NEXT JOB RETRIEVE" is then provided at step #1821.

When the status is "PRINT & READING" (YES at #1822), the control waits for the reading of all the images for a job to be completed (#1823), changes the status to "NEXT JOB RESERVATION ALLOWED" (#1824), retrieves the management table to determine whether an addition job reservation is allowed (#1825), and turns on/off the back light of the touch panel 91 and powers on/off image reader IR according to the decision result (#1826, #1827, #1828, #1829).

When the status is "NEXT JOB RETRIEVED" (YES at #1830), a decision is made on whether the job interleaving mode is set for the current job the printing of which is completed (#1831). When it is set (YES at #1831), a direction is provided that the job information to be printed on an interleaf is developed into image data (#1832) and then the status is changed to "WAITING FOR COMPLETION OF PRINTING" (#1833). If the job interleaving mode is not set (NO at #1831), the management table is retrieved to determine whether the next job is present (#1834). If the next job is present (YES at #1834), the output sequence is initiated (#1835) and the status is changed to "PRINT & READING". If there is not a next job (NO at #1834), the status is changed to "STANDBY".

When the status is "WAITING FOR COMPLETION OF PRINTING" (YES at #1838), the control waits until the job information to be printed on an interleaf is developed into image data (#1839), then provides printing on the interleave and changes the status to "INTERLEAF BEING PRINTED" (#1841). It should be noted that job information is printed on an interleaf so that the printed side faces upwards when the interleaf is discharged.

When the status is "INTERLEAF BEING PRINTED" (YES at #1842), the control waits until job information is printed on an interleaf (#1843), and then initiates printing the reserved next job (#1844) and changes the status to "NEXT JOB RESERVATION ALLOWED" (#1845).

It is needless to say that although the present invention has been described with reference to the example that job identification information is printed on the front side of an interleaf in the upward-facing mode, the present invention is not limited to this example and can be applied to the example that job identification information is printed on the backside of an interleaf reversed at sheet refeeder unit 600 in the downward-facing mode.

Figure 30:
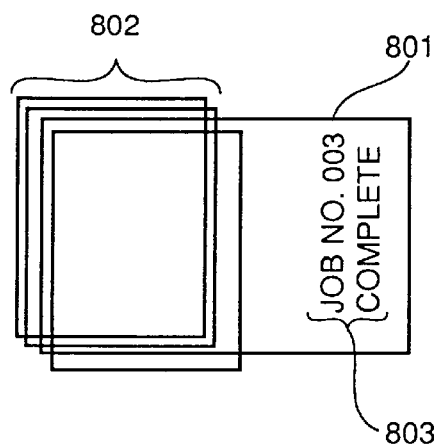
FIG. 30 illustrates a manner of sheets discharged at a discharge port of the copying machine according to the second embodiment.

FIG. 30 shows a manner of sheets discharged at a sheet discharging port of a copying machine. More specifically, FIG. 30 shows an interleaf 801 discharged between sets of sheets 802 for jobs discharged facedown, seen from the top. One example of the content of job identification information 803 "JOB No. 003 Complete" is printed on the back side of interleaf 801 reversed at sheet refeeder unit 600. While a group of sheets 802 of each job is discharged with the front sides, i.e., the printed sides, facing downward and thus the user cannot visually identify the job, interleaf 801 is discharged with job identification information 803 facing upward and thus the user can readily, visually identify the job.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:
   image forming means for forming on a sheet an image according to image data;
   first execution means for performing image formation for a first print job provided by said image forming means;
   registration means for registering a second print job while said first print job is being executed; and second execution means for performing image formation for said second print job registered by said registration means when a predetermined time period elapses after the image formation for said first print job is completed.

2. The image forming apparatus according to claim 1, wherein said predetermined time period is a time period sufficient for an operator to remove from said image forming apparatus a sheet having the image corresponding to said first print job formed thereon.

3. The image forming apparatus according to claim 1, further comprising setting means for setting said predetermined time period.

4. The image forming apparatus according to claim 1, wherein said setting means is provided with a plurality of predefined, predetermined time periods.

\* \* \* \* \*